US012614218B1

(12) United States Patent　　　(10) Patent No.:　US 12,614,218 B1
Cowgill, Jr. et al.　　　　　　　(45) Date of Patent:　Apr. 28, 2026

(54) CHAT BASED PRODUCT CONFIGURATOR

(71) Applicant: Marxent Labs LLC, Miamisburg, OH
　　　　　　(US)

(72) Inventors: Jeffrey L. Cowgill, Jr., Dayton, OH
　　　　　　(US); Jonathan Alan Jekeli, Seattle,
　　　　　　WA (US)

(73) Assignee: Marxent Labs LLC, Miamisburg, OH
　　　　　　(US)

( * ) Notice:　Subject to any disclaimer, the term of this
　　　　　patent is extended or adjusted under 35
　　　　　U.S.C. 154(b) by 0 days.

(21) Appl. No.: 19/004,752

(22) Filed:　　Dec. 30, 2024

Related U.S. Application Data

(60) Provisional application No. 63/557,556, filed on Feb.
　　25, 2024.

(51) Int. Cl.
　　*G06Q 30/0601*　　(2023.01)
　　*G06F 16/93*　　　(2019.01)
　　*G06T 15/00*　　　(2011.01)
　　*G06T 17/00*　　　(2006.01)
　　*G06T 19/20*　　　(2011.01)
(52) U.S. Cl.
　　CPC ......... *G06Q 30/0621* (2013.01); *G06F 16/93*
　　　　(2019.01); *G06Q 30/0643* (2013.01); *G06T*
　　　　*15/00* (2013.01); *G06T 17/00* (2013.01); *G06T*
　　　　*19/20* (2013.01); *G06T 2200/24* (2013.01);
　　　　*G06T 2210/04* (2013.01); *G06T 2219/012*
　　　　(2013.01); *G06T 2219/2008* (2013.01); *G06T*
　　　　*2219/2016* (2013.01); *G06T 2219/2024*
　　　　　　　　　　　　　(2013.01)
(58) Field of Classification Search
　　None
　　See application file for complete search history.

(56)　　　　　References Cited

U.S. PATENT DOCUMENTS

| | | | |
|---|---|---|---|
| D575,795 S | 8/2008 | Nathan |
| 7,643,692 B2 | 1/2010 | Dittlo |
| D669,906 S | 10/2012 | Cranfill |
| D687,047 S | 7/2013 | Hales |

(Continued)

FOREIGN PATENT DOCUMENTS

| | | |
|---|---|---|
| EP | 1732042 | 12/2006 |
| EP | 2317478 | 5/2011 |
| WO | 2019204826 | 10/2019 |

OTHER PUBLICATIONS

C. P. Hui, W.-M. Pang and V.-I. Tian, "Collaborative 3D accessories
customization and trading through web interface," 2017 3DTV
Conference: The True Vision—Capture, Transmission and Display
of 3D Video (3DTV-CON), Copenhagen, Denmark, 2017, pp. 1-4,
doi: 10.1109/3DTV.2017.8280424. (Year: 2017).*

(Continued)

*Primary Examiner* — Michelle T Kringen
(74) *Attorney, Agent, or Firm* — Sheppard Mullin Richter
& Hampton LLP

(57)　　　　　　ABSTRACT

Systems and methods for a chat based product configurator.
The chat based product configurator is configured to facili-
tate customization of objects for a physical space through a
chat interface or other virtual assistant. As a user selects
options, the application can display a preview of the product
configured with the selected options via the chat window. A
digital model of the customized objects can be generated for
preview and displayed at a predetermined location in the
virtual space.

20 Claims, 13 Drawing Sheets

(56)  References Cited

U.S. PATENT DOCUMENTS

| | | | |
|---|---|---|---|
| D716,318 | S | 10/2014 | Fan |
| D726,197 | S | 4/2015 | Kim |
| D726,214 | S | 4/2015 | Wantland |
| D732,052 | S | 6/2015 | Kim |
| D750,644 | S | 3/2016 | Bhutani |
| 9,818,228 | B2 | 11/2017 | Lanier |
| D809,006 | S | 1/2018 | Mehta |
| 10,083,542 | B1 | 9/2018 | Murao |
| D830,406 | S | 10/2018 | Baldi |
| 10,223,740 | B1 | 3/2019 | Gore |
| D864,990 | S | 10/2019 | Lee |
| 10,572,988 | B1 | 2/2020 | Chaturvedi |
| 10,600,255 | B2 | 3/2020 | Besecker |
| 10,614,625 | B1 | 4/2020 | Goetzinger, Jr. |
| D886,845 | S | 6/2020 | Kim |
| 10,672,191 | B1 | 6/2020 | Besecker |
| D898,074 | S | 10/2020 | Spors |
| 11,049,317 | B2 | 6/2021 | Besecker |
| 11,144,680 | B2 | 10/2021 | Jovanovic |
| 11,157,740 | B1 | 10/2021 | Agarwal |
| D941,877 | S | 1/2022 | Li |
| D953,372 | S | 5/2022 | Zhang |
| D958,829 | S | 7/2022 | Park |
| D966,286 | S | 10/2022 | Hwang |
| 11,544,901 | B2 | 1/2023 | Besecker |
| 11,593,870 | B2 | 2/2023 | Delgado |
| 11,734,929 | B2 | 8/2023 | Besecker |
| 11,783,385 | B1 | 10/2023 | Khosravan |
| 11,836,867 | B2 | 12/2023 | Sadalgi |
| 11,875,280 | B2 | 1/2024 | Besecker |
| 11,935,192 | B2 | 3/2024 | Besecker |
| D1,026,008 | S | 5/2024 | Agee |
| 12,073,618 | B2 | 8/2024 | Besecker |
| 12,154,021 | B1 | 11/2024 | Sternberg |
| 12,266,009 | B2 | 4/2025 | Wuang |
| 2002/0010655 | A1 | 1/2002 | Jan |
| 2004/0183926 | A1 | 9/2004 | Fukuda |
| 2005/0081161 | A1 | 4/2005 | MacInnes |
| 2008/0122840 | A1 | 5/2008 | Falco |
| 2012/0249544 | A1 | 10/2012 | Maciocci |
| 2013/0127893 | A1 | 5/2013 | Gokturk |
| 2013/0215116 | A1 | 8/2013 | Siddique |
| 2014/0152558 | A1 | 6/2014 | Salter |
| 2015/0243071 | A1 | 8/2015 | Jovanovic |
| 2015/0316985 | A1 | 11/2015 | Levesque |
| 2015/0324940 | A1 | 11/2015 | Samson |
| 2016/0026724 | A1 | 1/2016 | Ramsey |
| 2016/0210602 | A1 | 7/2016 | Siddique |
| 2016/0247324 | A1 | 8/2016 | Mullins |
| 2017/0336863 | A1 | 11/2017 | Tilton |
| 2018/0197339 | A1 | 7/2018 | Puvvada Sathyanarayana |
| 2019/0197599 | A1 | 6/2019 | Zia |
| 2019/0251622 | A1 | 8/2019 | Wiedmeyer |
| 2019/0325498 | A1 | 10/2019 | Clark |
| 2019/0325643 | A1 | 10/2019 | Besecker |
| 2020/0050857 | A1 | 2/2020 | Anello |
| 2020/0302681 | A1 | 9/2020 | Totty |
| 2020/0320792 | A1 | 10/2020 | Sadalgi |
| 2021/0049829 | A1 | 2/2021 | Yang |
| 2021/0125398 | A1 | 4/2021 | Bradley |
| 2021/0133850 | A1 | 5/2021 | Ayush |
| 2021/0150805 | A1 | 5/2021 | Stekovic |
| 2021/0279957 | A1 | 9/2021 | Eder |
| 2022/0114291 | A1 | 4/2022 | Li |
| 2022/0130126 | A1 | 4/2022 | Delgado |
| 2022/0292543 | A1 | 9/2022 | Henderson |
| 2023/0049221 | A1 | 2/2023 | Rout |
| 2023/0173395 | A1 | 6/2023 | Cella |
| 2023/0177594 | A1 * | 6/2023 | Besecker ............... G06T 19/20 |
| | | | 705/27.2 |
| 2023/0379649 | A1 | 11/2023 | Gonzalez Delgado |
| 2023/0410436 | A1 | 12/2023 | Beauchamp |
| 2024/0005371 | A1 * | 1/2024 | Swanson ............ G06Q 30/0603 |
| 2024/0112428 | A1 | 4/2024 | Levi |

OTHER PUBLICATIONS

Cant, R. J., et al., "Methods for Automated Object Placement in Virtual Scenes", 2009 11th International Conference on Computer Modelling and Simulation, Cambridge, UK, doi: 10.1109/UKSIM.2009.69., 2009 (Year: 2009), pp. 431-436.

He, Yu, et al., "Context-Consistent Generation of Indoor Virtual Environments Based on Geometry Constraints," IEEE Transactions on Visualization and Computer Graphics, vol. 28, No. 12, Dec. 2022 (Year: 2022), doi: 10.1109/TVCG.2021.3111729, pp. 3986-3999.

Higgins, Michelle, "How Would That Couch Look at Home? Check Your Phone", Oct. 3, 2017, <URL: https://www.nytimes.com/2017/10/03/style/apps-for-decorating-rooms.html>, (Year: 2017), 1 page.

Ikea.com, "Welcome to Ikea USA", Dec. 4, 2021, <URL: https://web.archive.org/web/20211204042836/https://www.ikea.com/us/en/>, (Year: 2021), 3 pages.

International Patent Application No. PCT/US2019/028574, Notification Concerning Transmittal of International Preliminary Report on Patentability (Chapter I of the Patent Cooperation Treaty) and International Preliminary Report on Patentability, dated Oct. 29, 2020, 9 pages.

International Patent Application No. PCT/US2019/028574, Notification of Transmittal of the International Search Report and the Written Opinion of the International Searching Authority, or the Declaration, dated Jul. 24, 2019, 12 pages.

International Patent Application No. PCT/US2018/059208, Notification of Transmittal of the International Search Report and the Written Opinion of the International Searching Authority, or the Declaration, dated Apr. 3, 2019, 10 pages.

International Patent Application No. PCT/US2018/062578, Notification of Transmittal of the International Search Report and the Written Opinion of the International Searching Authority, or the Declaration, dated Mar. 11, 2019, 10 pages.

Levine, Nicole, "How to Use IKEA Place on iPhone or iPad", youtube.com, <URL: https://www.wikihow.tech/Use-IKEA-Place-on-iPhone-or-iPad>, last updated Mar. 29, 2019 (Year: 2019), 10 pages.

Liu, Zicheng, et al., "Model-Driven Indoor Scenes Modeling from a Single Image," Proceedings of the 41st Graphics Interface Conference, Jun. 3, 2015, 8 pages.

Merrell et al., "Interactive Furniture Layout Using Interior Design Guidelines," ACM Transactions on Graphics, vol. 30, No. 4, Jul. 2011, 9 pages.

Orr, Susan, "Area Macy's Store Adds Virtual Reality Technology", <URL: https://www.ibj.com/blogs/19-property-lines/post/71071-area-macys-store-adds-virtual-reality-technology?utm_source=ibj-daily&utm_medium=newsletter&utm_campaign=2018-10-26#>, Oct. 26, 2018, 4 pages.

Roomle, "Roomle: Plan, Furnish, Configure and Buy", Mar. 16, 2017, youtube.com, <URL: https://www.youtube.com/watch?v=n_HdmyPZBaM>, (Year: 2017), 1 page.

Satkin, Scott, et al., "Data-Driven Scene Understanding from 3D Models," https://www.robots.ox.ac.uk/~vgg/rg/pa/pers/bmvc2012_satkin_data_driven.pdf, dated Jan. 2012, retrieved Dec. 16, 2015, 11 pages.

Sweet Home, "Sweet Home 3D User's Guide;", online at <URL: https://web.archive.org/web/20180208100505/http://www.sweethome3d.com:80/userGuide.jsp>, Feb. 8, 2018 (Year: 2018), pp. 1-15.

Xu, Kun, et al., "Sketch2Scene: Sketch-Based Co-Retrieval and Co-Placement of 3D Models," ACM Transactions on Graphics, vol. 32, No. 4, Jul. 1, 2013, 12 pages.

Xu, Ken, et al., "Constraint-Based Automatic Placement for Scene Composition", Graphics Interface, vol. 2, 2002 (Year: 2002), 11 pages.

Chang, Nelson L., et al., "Automatically Designed 3D Environments for Intuitive Exploration", 2004 IEEE International Conference on Multimedia and Expo (ICME), (IEEE Cat. No. 04TH8763), Taipei, 2004, vol. 3, doi: 10.1109/ICME.2004.1394699 (Year: 2004), pp. 2171-2174.

* cited by examiner

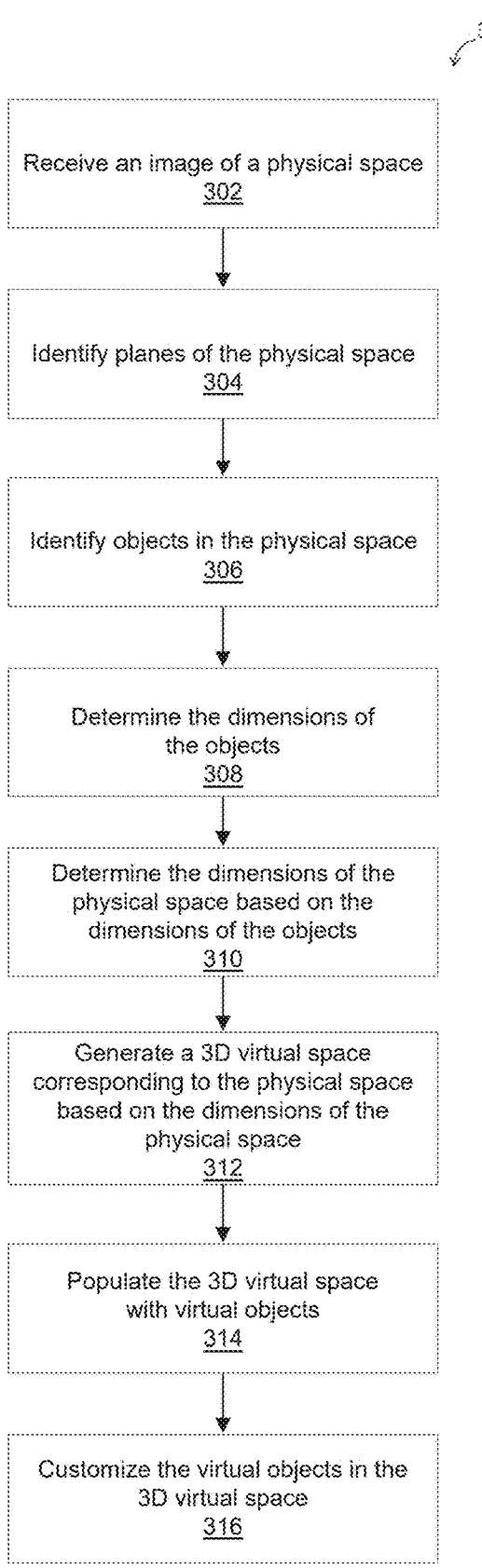

300

Receive an image of a physical space
302

Identify planes of the physical space
304

Identify objects in the physical space
306

Determine the dimensions of
the objects
308

Determine the dimensions of the
physical space based on the
dimensions of the objects
310

Generate a 3D virtual space
corresponding to the physical space
based on the dimensions of the
physical space
312

Populate the 3D virtual space
with virtual objects
314

Customize the virtual objects in the
3D virtual space
316

Receive user command through
chat interface
402

Generate response to user command
through chat interface based on
content from database
404

Provide customization options through
chat interface based on user
command
406

Customize product based on selection
of customization options through chat
interface
408

Facilitate transaction through
chat interface
410

600 walls, cabinets, and appliances
.jpg, .jpeg, or png.

Upload Kitchen Photo

Once the objects have been detected, we are running them through a proprietary visual database to identify the industry standard cabinet model/size.

CHAT BASED PRODUCT CONFIGURATOR

CROSS-REFERENCE TO RELATED APPLICATIONS

This application claims the benefit of U.S. Patent Application No. 63/557,556, filed on Feb. 25, 2024, the contents of which are hereby incorporated by reference herein in their entirety, for all purposes.

TECHNICAL FIELD

The disclosed technology relates to a computing system with integrated functionality for a chat based product configurator for facilitating customization of objects that can be rendered in a 3D virtual space on demand.

BACKGROUND

Conventional solutions for product configurators represent an interactive process where the user chooses a feature, which is validated via a configuration rules engine, before allowing the user to make the next choice about the remaining features on their product. The interactive process is typically limited by a system's inability to provide a flexible portal through which a user can access product support, product customization, and purchase.

Conventional product configurators typically lack the capability to provide on-demand rendering for customized objects that can be displayed in a three dimensional (3D) virtual space because of the resource intensive process that requires time and computing resources to design, refine, and finalize each model with corresponding selected options for the object.

BRIEF SUMMARY OF EMBODIMENTS

Systems, methods, and non-transitory computer-readable media are disclosed for a chat interface through which various user commands, including requests for information, requests for customization, and transaction requests, can be entered.

In one aspect, the disclosed technology provides for a chat interface through which a user can issue user commands in natural language text and receive responses in natural language text. In this manner, the disclosed technology provides technical solutions for product (i.e., object) customization display and render using the chat interface. Options for customizing a product can be associated with certain keywords that may be entered through the chat interface as user commands or provided through the chat interface as responses. In some cases, options for customizing a product can be provided based on an intent of a user command. The intent of a user command can be determined based on machine learning techniques.

The product can be customized based on the various user commands using product data (i.e., using information regarding an object). The product data may include for example, information about available products (or other objects) including different options for those products (e.g., product sizes, finishes, optional features and/or other options). A user can interact with the virtual assistant in a chat window as part of the 3D Product Configurator UI, asking questions about the product and its options and getting back accurate curated answers based on product data provided. As a user selected options, the application can display a preview of the product configured with the selected options via a chat window (or other display element). A digital model of the configured product may be displayed in the virtual space at a predetermined location (e.g., corresponding to the location of a corresponding object depicted in the image). For example, if a room in the image includes a chair, the user may desire to configure a customized chair that has options different than the one depicted in the image. Once configured, a digital model of the customized chair can be displayed at substantially the same location as the chair in the image. Alternatively, the application can be configured to select a different location to display the configured product.

In one aspect, the disclosed technology provides for a database for storage of product documentation. For example, documents of various formats (e.g., XML, HTML, PDF, TXT, RTF) can be collected in a database. The documents can relate to a variety of topics (e.g., product specification, product warranty, product manuals, repair manuals, FAQs). The documents can be processed to determine the content of the documents. The documents can be tokenized to categorize the content of the documents. An index can be maintained to facilitate searching of the tokens associated with the documents. In some embodiments, the documents can specify one or more rules for information of options that are compatible (e.g., product finishes only available with certain options). In this manner, components of the chat interface can leverage information stored in the database to determine certain product configurations (e.g., a leather trim for the base of a chair would only be available for models also having a selected option for a wood finish for legs of that chair).

The selected customization options for the customized product can be stored in a structured data object (e.g., JSON file). The structured data object can describe the product in terms of a structure of 3D model pieces that can be joined together to create a 3D model of the product. For each customization option selected for the customized product, a 3D model piece can be identified based on the structured data object. A custom 3D model can be generated based on the structure described in the structured data object and the 3D model pieces identified based on the structured data object.

Systems, methods, and non-transitory computer-readable media are disclosed for providing a software application with integrated functionality for facilitating room design from an image of a room or other space. One component of the application is configured determine the floorplan of a space in the image based on information in the image. This may include using image analysis on objects in the image to detect the planes and vertices of the space to determine the floorplan of the space (e.g., a room's shape and dimensions) and generating a three-dimensional (3D) virtual space with a floorplan that substantially corresponds to the floorplan of the dimensions of the physical space (e.g., room) depicted in the image. Another component of the application can include a virtual assistant product configurator. The product configurator may be configured to facilitate customization of objects for the room through a chat interface or other virtual assistant. A digital model of the customized objects can be generated for preview and/or be displayed at a predetermined location in the virtual space. According to one example, the product configurator may be a 3D product configurator. The product configurator can be based in part on an artificial intelligence (AI) model (e.g., a foundation model or other model) that is trained specific product data. The product data may include for example, information about available products (or other objects) including different options for those products (e.g., product sizes, finishes, optional features and/or other options. A user can interact with the virtual assistant in a chat window as part of the 3D Product Configurator UI, asking questions about the product and its options and getting back accurate curated answers based on product data provided. As a user selected options, the application can display a preview of the product configured with the selected options via a chat window (or other display element). A digital model of the configured product may be displayed in the virtual space at a predetermined location (e.g., corresponding to the location of a corresponding object depicted in the image). For example, if a room in the image includes a chair, the user may desire to configure a customized chair that has options different than the one depicted in the image. Once configured, a digital model of the customized chair can be displayed at substantially the same location as the chair in the image. Alternatively, the application can be configured to select a different location to display the configured product.

The 3D virtual space can include virtual objects with dimensions that correspond with the dimensions of physical objects (e.g., appliances, furniture and/or other objects) in the physical space. The disclosed technology provides for customizing the 3D virtual space. For example, a virtual object in the 3D virtual space can be removed, replaced, moved, modified, and the like. A virtual object can be customized and added to the 3D virtual space. As further described in detail below, the disclosed technology provides for efficient, visually accurate, and intuitive room design based on 2D images without use of LiDAR or physical measurements. Systems, methods, and non-transitory computer-readable media are disclosed for a chat interface through which various user commands, including requests for information, requests for customization, and transaction requests, can be entered. Information regarding an object can be provided based on the various user commands. The information can be based on documentation associated with the object, and the documentation can be stored in a database. The object can be customized based on the various user commands. The object can be purchased based on the various user commands. In this way, the disclosed technology provides for a flexible portal through which a user can access product support, product customization, and product purchase.

Systems, methods, and non-transitory computer-readable media are disclosed for customizing a product with on demand rendering. A 3D virtual space can be generated based on a 2D image of a physical space. The dimensions of the 3D virtual space can be determined. Based on the dimensions of the 3D virtual space, parameters for rendering a product in the 3D virtual space can be determined. The parameters can include, for example, field of view, position, and size. A customized product can be generated based on selected customization options. The customized product can be rendered in the 3D virtual space based on the parameters. A preview (e.g., 2D image) of the customized product can be generated based on the render of the customized product in the 3D virtual space.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting the breadth, scope, or applicability thereof. It should be noted that for clarity and ease of illustration these drawings are not necessarily made to scale.

FIG. 3 is an example flow diagram of example methods supported by the disclosed technology, in accordance with the embodiments disclosed herein.

Figure 1:
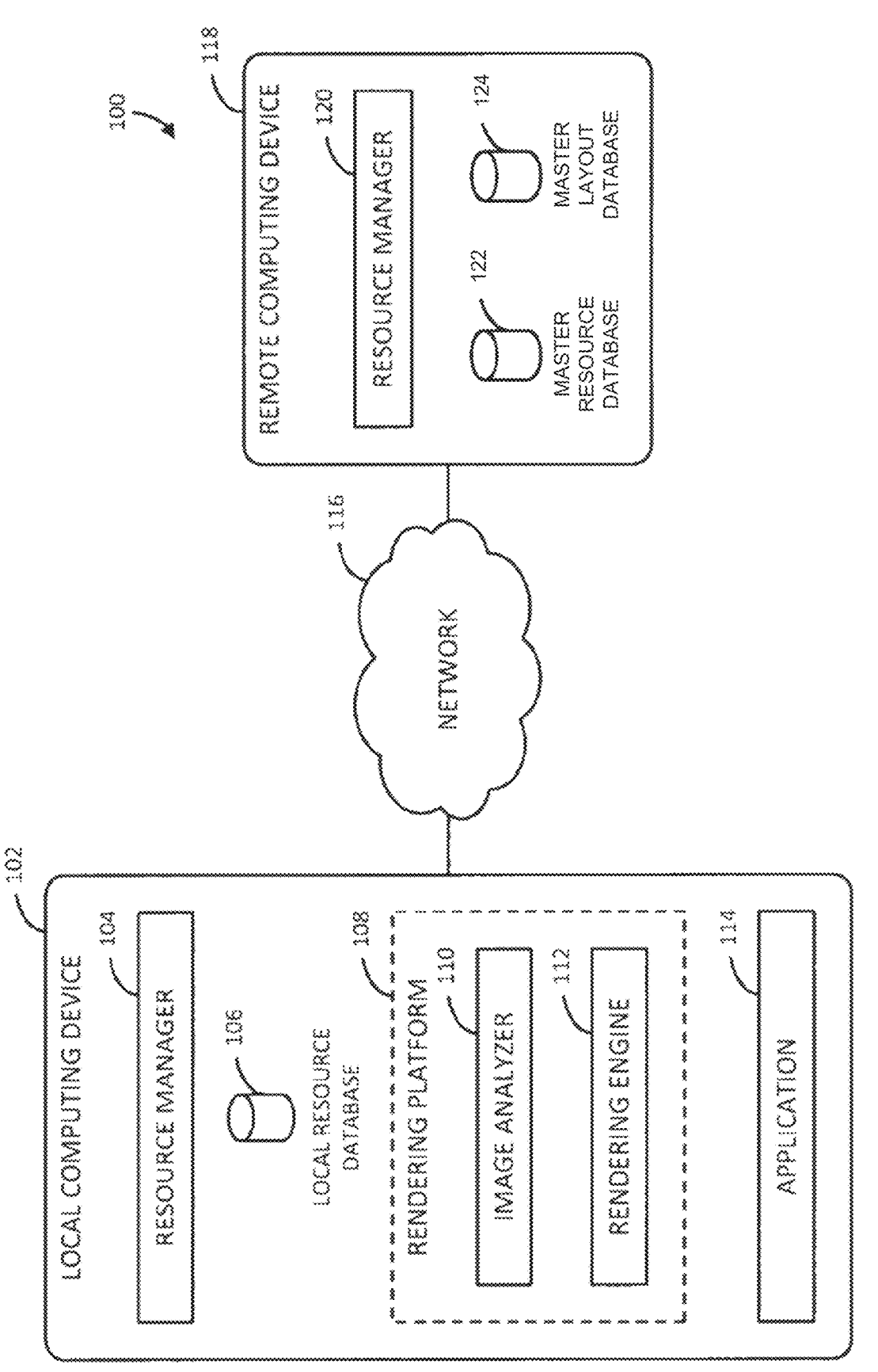
FIG. 1 is an example block diagram of at least a system for 3D placement of 3D models based on a 2D image, in accordance with the embodiments disclosed herein.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Room Scanning

As background, conventional approaches to room design face various well known drawbacks and limitations. Designing a room typically begins with measuring the dimensions of the room, which under conventional approaches, requires manual measurements. Recent advances have provided for measuring the dimensions of a room using light detection and ranging (LiDAR). However, for a typical person who is interested in designing or redesigning a room, a LiDAR device may not be readily accessible. Furthermore, measuring the dimensions of one room may not justify the cost of a LiDAR device.

An improved approach rooted in computer technology overcomes the foregoing and other challenges arising under conventional approaches. The disclosed technology provides for generating a three-dimensional (3D) virtual space with dimensions that correspond with the dimensions of a physical space (e.g., room) depicted in a two-dimensional (2D) image. The 3D virtual space can include virtual objects with dimensions that correspond with the dimensions of physical objects (e.g., furniture) in the physical space. The disclosed technology provides for customizing the 3D virtual space. For example, a virtual object in the 3D virtual space can be removed, replaced, moved, modified, and the like. A virtual object can be customized and added to the 3D virtual space. As further described in detail below, the disclosed technology provides for efficient, visually accurate, and intuitive room design based on 2D images without use of LiDAR or physical measurements.

In one aspect, the disclosed technology provides for generating a 3D virtual space from a 2D image of a physical space based on machine learning techniques (e.g., computer vision, artificial intelligence). For example, a machine learning model can identify planes (e.g., walls, floor, ceiling) of a physical space depicted in a 2D image. The machine learning model can identify the planes, for example, by locating corners in the physical space and extending planes for the walls, the floor, and the ceiling of the physical space from the corners. The machine learning model can identify objects (e.g., furniture) of the physical space depicted in the 2D image. Based on identification of the objects, dimensions of the objects can be determined. The dimensions of the physical space can be determined based on the dimensions of the objects. A 3D virtual space with dimensions corresponding to the dimensions of the physical space can be generated based on the dimensions of the physical space. For example, a virtual object can be rendered in the 3D virtual space sized appropriately based on the dimensions of the physical object corresponding to the virtual object relative to the dimensions of the physical space corresponding to the 3D virtual space.

A machine learning model can be trained to identify planes of a physical space depicted in a 2D image based on training data. In one implementation, the training data can include instances of labeled images. A labeled image can include an image of a physical space and labels for planes depicted in the physical space. For example, an instance of training data can include an image of a room and labels for the walls, the floor, and the ceiling of the room. The machine learning model can be trained to minimize a loss function between identifications of planes in images of physical spaces and labels for the planes in the images. Once trained, the machine learning model can be applied to an image of a physical space. The machine learning model can identify the planes of the physical space. The planes identified by the machine learning model can be extended as appropriate. For example, a plane corresponding with a wall occluded by objects can be extended to fill the spaces occluded by the objects. In one implementation, the training data can include instances of training pairs. An instance of a training pair can include an image of a physical space and a corresponding image of the planes in the physical space. For example, an instance of training data can include an image of a room and a corresponding image of the planes for the walls, the floor, and the ceiling of the room. For an instance of a training pair, the machine learning model can be trained to generate, based on an image of a physical space from the training pair, a corresponding image of the planes of the physical space. The machine learning model can be trained to minimize a loss function between the corresponding image of the planes of the physical space and an image of the planes in the physical space from the training pair. Once trained, the machine learning model can be applied to an image of a physical space. The machine learning model can generate a corresponding image that depicts the planes of the physical space.

In one aspect, the dimensions of objects can be determined based on an object database (e.g., product database). The object database can include dimensions (e.g., width, length, height) of objects and identification information (e.g., object images, product numbers, model numbers, identifying marks) of the objects. A machine learning model can identify objects depicted in a 2D image and determine the dimensions of the objects based on the object database. For example, an object in a 2D image can be identified by matching the object with an image of the object in the object database. As another example, the object can be identified based on a logo, model number, product number, or other identifying mark on the object depicted in the 2D image. Based on the identification of the object in the object database, the dimensions of the object can be retrieved from the object database.

Additionally, or alternatively, the dimensions of objects can be determined based on machine learning techniques. For example, a machine learning model can be trained to identify objects with known or standard sizes depicted in a 2D image. The machine learning model can be trained based on training data. The training data can include instances of labeled images. A labeled image can include an image of a physical space and objects in the physical space. The labeled image can include labels identifying the objects that have known or standard sizes as well as the sizes. For example, standard kitchen cabinets have standard heights of 12 inches, 15 inches, 18 inches, 30 inches, 36 inches, and 42 inches. A labeled image can include an image of a kitchen with standard kitchen cabinets. The labeled image can be labeled to identify the standard kitchen cabinets and provide the heights of the cabinets. The machine learning model can be trained to identify an object that has a known or standard size and determine the size of the object based on the identification. Once trained, the machine learning model can be applied to an image of a physical space. The machine learning model can identify the objects in the physical space that have known or standard sizes and determine the sizes of those objects.

In some cases, the identification and the size of an object may need to be confirmed or corrected. In one aspect, the disclosed technology provides for an interface through which a user can provide confirmation of an identification and a size of an object as well as make corrections to the identification and the size of the object. For example, an object in a physical space in a 2D image can be identified and labeled by a machine learning model. The object can be labeled to indicate what the object is identified as (e.g., product name, model number) and the size of the object. The labeled object and the 2D image can be provided through an interface for a user. The user can select the labeled object and confirm that the object is identified accurately or correct the identification of the object (e.g., correct the product name, correct the model number). The user can select the labeled object and confirm that the size of the object is accurate or correct the size of the object. User confirmations and user corrections can be provided as additional training data for further training the machine learning model.

In one aspect, the dimensions of a physical space in a 2D image can be determined based on the dimensions of the objects in the physical space. The dimensions of the physical space relative to the dimensions of the objects in the physical space can be determined based on a visual analysis of the 2D image. The dimensions of the object can be determined, for example, based on an object database or based on a machine learning technique. Based on the relative dimensions of the physical space with respect to the object, the dimensions of the physical space can be determined from the dimensions of the object. For example, a 2D image can depict an object adjacent to a wall in a physical space. In this example, the height of the wall can be three times as tall as the height of the object. Therefore, based on the height of the object, which can be determined based on an object database or based on a machine learning technique, the height of the wall can be determined by multiplying the height of the object by three.

In some cases, the dimensions of a physical space may need to be confirmed or corrected. In one aspect, the disclosed technology provides for an interface through which a user can provide confirmation of the dimensions of a physical space and make corrections to the dimensions of the physical space. For example, the dimensions of a physical space in a 2D image can be determined based on the dimensions of an object in the physical space. The dimensions of the physical space can be provided through an interface for a user. The user can confirm the dimensions of the physical space are accurate or correct the dimensions of the physical space. In cases where the user corrects the dimensions of the physical space, the interface can direct the user to the object in the physical space for confirmation or correction of the dimensions of the object. The user can confirm the dimensions of the object or correct the dimensions of the object. User confirmations and user corrections of the dimensions of the physical space and the dimensions of the object can be used as training data for a machine learning model.

In one aspect, the disclosed technology generates a 3D virtual space based on the dimensions of a physical space depicted in a 2D image. The 3D virtual space can be populated with virtual objects that correspond with objects in the physical space depicted in the 2D image. The 3D virtual space can have dimensions corresponding with the dimensions of the physical space, and the virtual objects can have dimensions corresponding with the dimensions of the objects in the physical space. Portions of the 2D image can be applied to the 3D virtual space and the virtual objects to generate a 3D render of the physical space. In this way, a 3D virtual space that corresponds with a physical space can be generated.

The 3D virtual space can be customized to preview various changes to the design of the physical space. For example, virtual objects in the 3D virtual space can be removed. New virtual objects can be generated and placed in the 3D virtual space. The new virtual objects can be removed, customized, and replaced in the 3D virtual space. As the dimensions of the 3D virtual space correspond with the dimensions of the physical space, the new virtual objects can be sized appropriately for the 3D virtual space. In this way, the sizes of the new virtual objects relative to the virtual objects and the 3D virtual space is reflective of how physical objects corresponding with the new virtual objects would look in the physical space.

For example, a user can provide a 2D image of a room with various furniture. A 3D virtual space representing the room can be generated based on the 2D image. In this example, the planes, including the walls, the floor, and the ceiling, of the room can be determined based on the 2D image. The furniture in the 2D image can be identified, and the dimensions of the furniture can be determined based on an object database. The furniture can be found in the object database, and the dimensions of the furniture can be retrieved from the object database. Based on the dimensions of the furniture, the dimensions of the room can be determined. The 3D virtual space can be sized appropriately based on the dimensions of the room. Virtual objects representing the furniture can be placed in the 3D virtual space. Portions of the 2D image can be applied to the 3D virtual space and the virtual objects to generate a 3D view of the room. In this example, an interface can be provided through which the user can customize the 3D virtual space. The user can select a piece of furniture in the 3D virtual space and remove the piece of furniture. The user can select a new piece of furniture and place the new piece of furniture in the 3D virtual space. As the dimensions of the piece of furniture and the dimensions of the 3D virtual space have been determined, the dimensions of the new piece of furniture can be made appropriate for the 3D virtual space. Here, the user is provided with an accurate preview of how the new piece of furniture would look in the room.

It should be understood that various adaptations of the disclosed technology are possible. For example, in one aspect, the disclosed technology identifies a style of a physical space based on contextual information determined based on a 2D image of the physical space. The contextual information can include, for example, the dimensions of the physical space, identification of objects in the physical space, the dimensions of the objects, and the like. For example, by identifying the product names of objects in a physical space, a design style associated with the physical space can be determined based on the product names of the objects being associated with the design style. In one aspect, multiple 2D images of a physical space can be used to build a single 3D virtual space. For example, multiple 3D virtual spaces can be generated based on multiple 2D images of a physical space and then joined together to form a single 3D virtual space. The multiple 3D virtual spaces can be joined together, for example, based on objects identified in the multiple 2D images that serve as reference points for where the 3D virtual spaces overlap. As the dimensions of the 3D virtual spaces can be determined based on the 2D images, the 3D virtual spaces can be joined seamlessly to capture the entirety of the physical space.

Approaches for Product Configuration

As background, conventional approaches to room design face various well known drawbacks and limitations. For example, furniture is becoming increasingly varied and customizable. A typical person who is interested in designing or redesigning a room may become frustrated trying to navigate the vast variety of furniture and customizations for the furniture.

An improved approach rooted in computer technology overcomes the foregoing and other challenges arising under conventional approaches. The disclosed technology provides for a chat interface through which various user commands, including requests for information, requests for customization, and transaction requests, can be entered. Information regarding an object can be provided based on the various user commands. The information can be based on documentation associated with the object, and the documentation can be stored in a database. The object can be customized based on the various user commands. The object can be purchased based on the various user commands. In this way, the disclosed technology provides for a flexible portal through which a user can access product support, product customization, and product purchase.

In one aspect, the disclosed technology provides for a chat interface through which a user can issue user commands in natural language text and receive responses in natural language text. The chat interface can be supported by various machine learning techniques (e.g., large language models, natural language processing, artificial intelligence). For example, a machine learning model can be trained based on training data that includes text corpora. Based on the text corpora, the machine learning model can be provided with a sequence of words and trained to predict the next word in the sequence. Based on any difference between the next word in the sequence and the prediction of the next word in the sequence, the machine learning model can be tuned (e.g., by adjusting weights) to reduce the difference. The machine learning model can be trained to parse a user command provided in natural language text and provide a response to the user command in natural language text. The response can be based on a database or repository of information, such as product documentation. The user command can be parsed as a search for information. The database can be searched based on the user command. A response can be generated based on search results from the search of the database. By basing the response on a search of the database, the response can be derived from factual information.

In one aspect, the disclosed technology provides for a database for storage of documentation. For example, documents of various formats (e.g., XML, HTML, PDF, TXT, RTF) can be collected in a database. The documents can relate to a variety of topics (e.g., product specification, product warranty, product manuals, repair manuals, FAQs). The documents can be processed to determine the content of the documents. The documents can be tokenized to categorize the content of the documents. An index can be maintained to facilitate searching of the tokens associated with the documents. When a user command that involves a request for information is received, the user command is parsed to determine query terms for a search of the database. The search can be performed, for example, by searching the index, searching the tokens, or performing a full text search of the documents. Content that satisfy the search can be returned as search results. A response to the user command can be generated based on the content that satisfy the search.

The database can be updated as appropriate with new documents. For example, when a new product is introduced, then documentation for the new product can be provided to update the database. As another example, updated documents can be provided to replace outdated or inaccurate documents in the database. In one aspect, the disclosed technology provides for an interface through which new documents and updated documents can be provided to the database.

In one aspect, the disclosed technology provides for customization of a product through the chat interface. Options for customizing a product can be associated with certain keywords that may be entered through the chat interface as user commands or provided through the chat interface as responses. For example, a user can provide a user command to request recommendations for customizing a product, such as by customizing a color. The user command can include keywords, such as "color", that prompt options for customizing the product. In this example, the options for customizing the product can include options for changing the color of the product. As another example, a user can provide a user command to request information on how to use a product, such as how to adjust the height of a chair. A response to the user command can include keywords, such as "handle" or "lever", that prompt options for customizing the product. In this example, the options for customizing the product can include options for changing the handle.

In some cases, options for customizing a product can be provided based on an intent of a user command. The intent of a user command can be determined based on machine learning techniques (e.g., large language models, natural language processing, artificial intelligence). For example, a machine learning model can be trained to associate words and expressions with intents. The machine learning model can be trained to classify an intent of a user command based on the association of words and expressions with intents. The machine learning model can be trained based on training data that includes labeled text. The labeled text can include text labeled with corresponding intents. Once trained, the machine learning model can be provided with a user command and determine an intent associated with the user command. Based on the intent, options for customizing a product can be provided.

In one aspect, the disclosed technology provides for selecting customizations and facilitating transactions through the chat interface. A user can provide user commands to select options for customizing a product. Based on the user commands, the selected option for customizing the product can be applied. A response can be provided through the chat interface to confirm the customization was applied. When the user is satisfied with the customization of the product, the user can provide user commands to add the product to a shopping card, purchase the product, and the like. Responses can be provided through the chat interface to confirm the requested transaction was performed.

For example, a user can access a chat interface to request information regarding a product. In this example, the user can provide user commands requesting information on the product including how to use the product, how to fix the product if it becomes broken, what kind of warranties cover the product, what kind of materials are used in the product, and the like. In response to the user commands, searches through a database that includes documents related to the product are performed. Responses to each user command are generated based on content in the documents that are responsive to the searches. Additionally, in response to the user commands, intents to customize the product can be determined. Based on the intents, various options to customize the product can be provided. The user can select the options to customize the product through user commands provided through the chat interface. Finally, the user can purchase the customized product through the chat interface.

It should be understood that various adaptations of the disclosed technology are possible. For example, in one aspect of the disclosed technology, the chat interface is provided as part of a larger user interface through which a user can navigate through various products, various configurations, and the like. The user interface can provide, for example, selected customizations of a product and other results of user commands provided through the chat interface. In one aspect of the disclosed technology, functions performed through the chat interface can be performed through the user interface. For example, options for customizing a product can be provided as selectable options in the user interface. The customizations performed through the user interface and through the chat interface can be synchronized so that a user can use either interface.

Approaches for Product Configuration with on Demand Rendering

As background, conventional approaches to room design do not provide for previewing custom furniture. As a result, even after a piece of furniture has been selected and customized, how well the piece of furniture fits in a room can be difficult to determine. Given these well known drawbacks and limitations, conventional approaches to room design are tedious, time consuming, and frustrating.

An improved approach rooted in computer technology overcomes the foregoing and other challenges arising under conventional approaches. The disclosed technology provides for customizing a product with on demand rendering. A 3D virtual space can be generated based on a 2D image of a physical space. The dimensions of the 3D virtual space can be determined. Based on the dimensions of the 3D virtual space, parameters for rendering a product in the 3D virtual space can be determined. The parameters can include, for example, field of view, position, and size. A customized product can be generated based on selected customization options. The customized product can be rendered in the 3D virtual space based on the parameters. A preview (e.g., 2D image) of the customized product can be generated based on the render of the customized product in the 3D virtual space. In this way, the disclosed technology provides for on demand rendering of customized products and facilitates convenient and useful previews of the customized products.

In one aspect, the disclosed technology provides for generating a 3D virtual space from a 2D image of a physical space. Various approaches to generating the 3D virtual space, described above, can be used here. For example, a machine learning model can identify the planes of a physical space in a 2D image. A machine learning model can identify objects in the physical space and determine the dimensions of the objects. Based on the dimensions of the objects, the dimensions for a 3D virtual space that corresponds with the physical space can be determined. The 3D virtual space can be generated with the appropriate dimensions.

In one aspect, the disclosed technology provides for customizing a product to render in the 3D virtual space. Various approaches to customizing a product, described above, can be used here. For example, a user can select from among various options for customizing a product in a user interface. A customized product can be rendered for the 3D virtual space based on the selected customization options.

In one aspect, the disclosed technology renders a customized product based on the selected customization options. As various products can have a wide variety of customization options, it is not feasible to create a 3D model of each possible combination of products and customization options. Accordingly, the disclosed technology provides for on demand rendering of the customized product. The selected customization options for the customized product can be stored in a structured data object (e.g., JSON file). The structured data object can describe the product in terms of a structure of 3D model pieces that can be joined together to create a 3D model of the product. For each customization option selected for the customized product, a 3D model piece can be identified based on the structured data object. A custom 3D model can be generated based on the structure described in the structured data object and the 3D model pieces identified based on the structured data object.

To render the custom 3D model to fit appropriately in the 3D virtual space, the disclosed technology provides for determining parameters for how to present the custom 3D model. In one aspect, the disclosed technology determines parameters for how to present the custom 3D model based on machine learning techniques (e.g., artificial intelligence). A machine learning model can be trained based to determine the parameters for how to present a 3D model that fits appropriately in a 3D virtual space. The machine learning model can be trained based on training data that includes instances of labeled images. The labeled images can include images of various products in various physical spaces. The labeled images can be labeled with parameters associated with the images. The parameters can include, for example, field of view, product position, product size, and the like. Once trained, the machine learning model can be applied to an image of a product in a physical space. The machine learning model can generate parameters associated with the image, such as a field of view of the product, a position of the product, and a size of the product. Based on the parameters, the disclosed technology can render the custom 3D model to fit appropriately in a 3D virtual space. In one aspect, the disclosed technology generates a preview of the customized product by generating an image of the customized product in the 3D virtual space.

For example, a user can provide an image of a room that includes a piece of furniture the user seeks to replace. Based on the image, a 3D virtual space corresponding to the room can be generated. Additionally, parameters for generating a custom piece of furniture to render in the 3D virtual space can be determined. In this example, the user can customize a custom piece of furniture based on a variety of customization options. A 3D model of the custom piece of furniture can be generated based on the customization options selected by the user. The 3D model can be rendered in the 3D virtual space, replacing the piece of furniture the user seeks to replace, based on the parameters. In this way, the disclosed technology generates an accurate preview of the custom piece of furniture provided in the context of the room where the user seeks to place it.

Hardware Implementation

FIG. 1 is an example system 100 for generating a 3D virtual space from a 2D image according to the present disclosure. In the example system 100, local computing device 102 and remote computing device 118 may be communicatively coupled via network 116. The illustrative local computing device 102 includes a resource manager 104 and an application 114. Application 114 of local computing device 102 (e.g., a 3D room designer application, a web browser application, or other software application installed with local computing device 102) may be displayed by the interface of local computing device 102 for the user to interact with (e.g., via a touchscreen display), including interactions to compose a 3D virtual space, placing virtual objects (e.g., 3D models) in the 3D virtual space, or other interactions discussed herein. Application 114 may be embodied as any combination of hardware, firmware, software, or circuitry usable to perform the functions described herein.

Local computing device 102 may comprise a smartphone, tablet, laptop, wearable electronic device, or other computing devices that provide an interface for displaying the virtual environment with 3D models placed within it. Computer-readable instructions incorporated with local computing device 102 are configured to instruct the processor of local computing device 102 on the placement and display of the 3D models, as further described herein.

Figure 2:
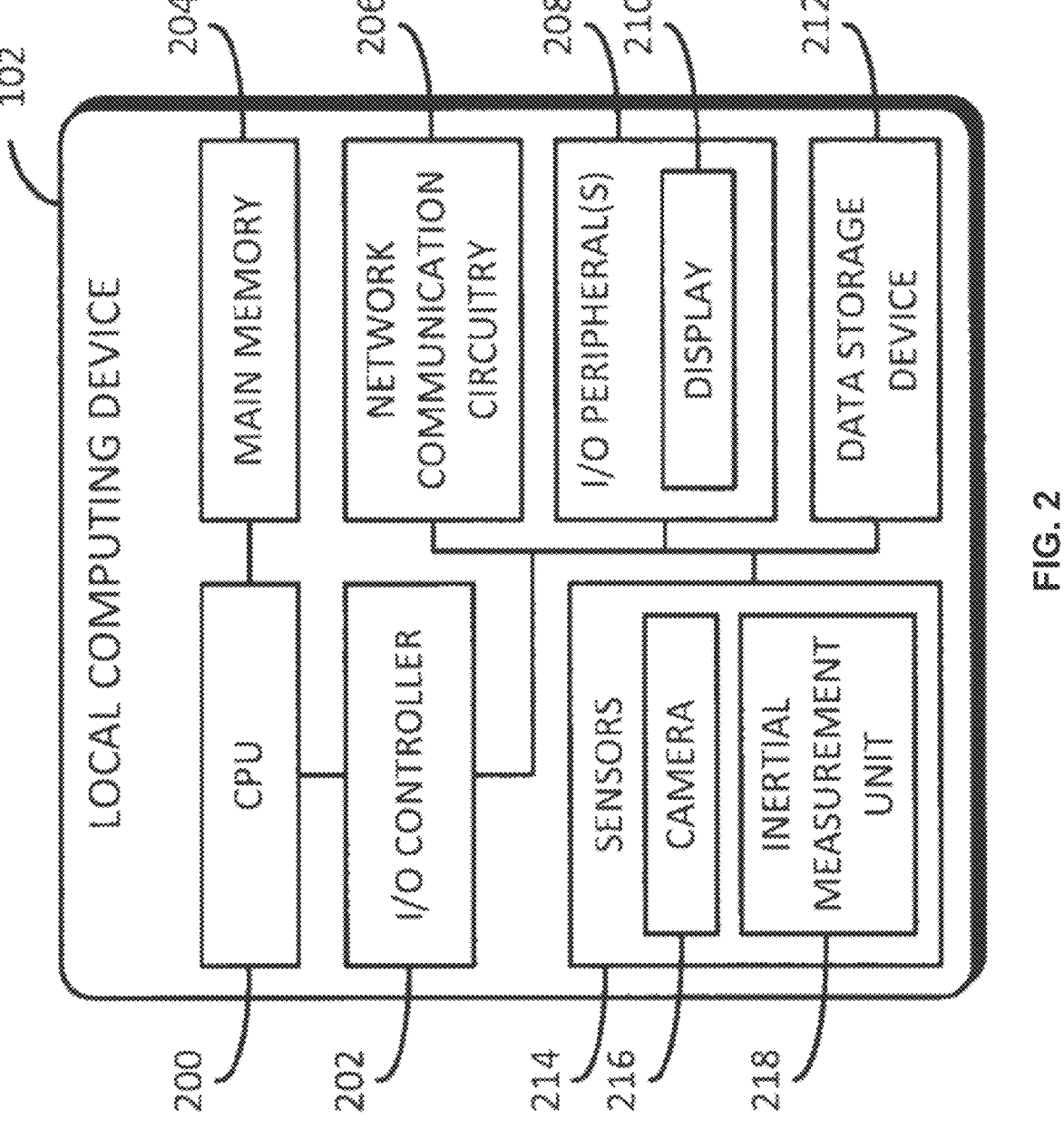
FIG. 2 is an example block diagram of at least one computing device of the system of FIG. 1, in accordance with the embodiments disclosed herein.

FIG. 2 illustrates local computing device 102, in accordance with the embodiments disclosed herein. Local computing device 102 may include a central processing unit (CPU) 200, input/output (I/O) controller 202, memory 204, network communication circuitry 206, one or more I/O peripherals 208, data storage device 212, and various sensors 214. Local computing device 102 may include additional, fewer, and/or alternative components to those of the illustrative local computing device 102, such as a graphics processing unit (GPU). One or more of the illustrative components may be combined on a single system-on-a-chip (SoC) on a single integrated circuit (IC). The type of components of local computing device 102 may be predicated upon the type and/or intended use of local computing device 102.

CPU 200, or processor, may be embodied as any combination of hardware and circuitry capable of processing data. Local computing device 102 may include more than one CPU 200. CPU 200 may include at least one processing core (not shown), such as in single-core processor architecture, or multiple processing cores, such as in multi-core processor architecture. Irrespective of the number of processing cores and CPUs 200, CPU 200 may be capable of reading and/or executing program instructions. CPU 200 may include cache memory (not shown) that may be integrated directly with CPU 200 or placed on a separate chip with a separate interconnect to CPU 200. In one or more scenarios, pipeline logic may be used to perform software and/or hardware operations (e.g., network traffic processing operations), rather than commands issued to/from CPU 200.

I/O controller 202, or I/O interface, may be embodied as any type of computer hardware or combination of circuitry capable of interfacing between input/output devices and local computing device 102. Illustratively, I/O controller 202 may be configured to receive input/output requests from CPU 200, and send control signals to the respective input/output devices, thereby managing the data flow to/from local computing device 102.

Memory 204 may be embodied as any type of computer hardware or combination of circuitry capable of holding data and instructions for processing. Such memory 204 may be referred to as main or primary memory. In one or more scenarios, one or more components of local computing device 102 may have direct access to memory, such that certain data may be stored via direct memory access (DMA) independently of CPU 200.

Network communication circuitry 206 may be embodied as any type of computer hardware or combination of circuitry capable of managing network interfacing communications (e.g., messages, datagrams, packets, etc.) via wireless and/or wired communication modes. Network communication circuitry 206 may include a network interface controller (NIC) capable of being configured to connect local computing device 102 to a computer network, as well as other devices.

I/O peripherals 208 may be embodied as any auxiliary device configured to connect to and communicate with local computing device 102. For example, I/O peripherals 208 may include but are not limited to, a mouse, a keyboard, a monitor, a touchscreen, a printer, a scanner, a microphone, a speaker, etc. Accordingly, it should be appreciated that some I/O devices are capable of one function (i.e., input or output), or both functions (i.e., input and output). The illustrative I/O peripherals 208 includes a display, which may be embodied as a touchscreen display capable of receiving user input via touch (e.g., one or more fingers, a stylus, etc.).

I/O peripherals 208 may be connected to local computing device 102 via a cable (e.g., a ribbon cable, a wire, a universal serial bus (USB) cable, a high-definition multimedia interface (HDMI) cable, etc.) of local computing device 102. In one or more scenarios, the cable may be connected to a corresponding port (not shown) of the local computing device 102 for which the communications made therebetween can be managed by I/O controller 202. I/O peripherals 208 may be connected to local computing device 102 via a wireless mode of communication (e.g., Bluetooth®, Wi-Fi®, etc.) which can be managed by network communication circuitry 206.

Data storage device 212 may be embodied as any type of computer hardware capable of the non-volatile storage of data (e.g., semiconductor storage media, magnetic storage media, optical storage media, etc.). Such data storage devices 212 are commonly referred to as auxiliary or secondary storage and may be used to store a large amount of data relative to the memory 204 described above.

Illustrative sensors 214 include camera sensor 216 and inertial measurement unit (IMU) sensor 218. Sensors 214 may include one or more additional sensors 214. Camera sensor 216 may be embodied as any type of image sensor (e.g., complementary metal-oxide-semiconductor (CMOS), charge-coupled device (CCD), hybrid CCD/CMOS, etc.) capable of capturing different types of scene data, such as color image data (RGB), color and depth image data (RGBD camera), depth sensor, stereo camera (L/R RGB), YUV, GRAY scale, or any other image sensor technology that can generate digital image frames.

IMU sensor 218 may include one or more software or hardware gyroscopes to measure the orientation of local computing device 102 (e.g., a 3-axis gyroscope), accelerometers to measure the proper acceleration of the local computing device 102 (e.g., a 3-axis accelerometer), magnetometers to measure the direction of the Earth's magnetic field relative to local computing device 102 (e.g., a 3-axis magnetometer), or any other type of inertial motion measurement software/hardware usable to perform the functions described herein (e.g., measure motion along three perpendicular linear axes and the rotation around each of the three perpendicular linear axes).

Illustrative sensors 214 may be used to determine one or more measurements of the room. For example, local computing device 102 may be placed in a room and/or moved to scan a room. The measurements may be determined by capturing one or more images using camera sensor 216 and correlating the scale (e.g., of a size marker, etc.) to determine actual measurements and placements of structural elements (e.g., a window, door, preexisting counter or furniture, etc.). Other known algorithms may be implemented without diverting from the essence of the disclosure. The room measurements may be stored in local resource database 106 and/or transmitted to remote computing device 118.

Referring back to FIG. 1, local computing device 102 may comprise resource manager 104, local resource database 106, rendering platform 108, image analyzer 110, rendering engine 112, and application 114.

Resource manager 104 may be embodied as any type of firmware, hardware, software, circuitry, or a combination thereof, which may be configured to manage the 3D model data stored in local resource database 106. Resource manager 104 may be configured to receive a request from application 114 that includes identifying information of objects that are to be rendered as 3D models from the 3D model data. Upon receiving the request, resource manager 104 may be configured to determine whether the corresponding 3D model data are stored in local resource database 106 (e.g., via a read/query operation). If so, resource manager 104 transmits the 3D model data to rendering platform 108 such that rendering engine 112 of rendering platform 108 can render the object as a function of the 3D model data received from resource manager 104 local to local resource database 106 or resource manager 120 that is remote from local resource database 106 at remote computing device 118. If resource manager 104 determines that one or more, or all, of the 3D model data may be stored in local resource database 106, resource manager 104 may be configured to retrieve the 3D model data from local resource database 106 and transmit them to application 114.

Resource manager 104 may be configured to determine that a 3D model data is not stored in local resource database 106. Resource manager 104 may transmit a request to master resource database 122 of remote computing device 118 requesting the missing 3D model data. The request may be usable by resource manager 120 of remote computing device 118 to determine which 3D model data is being requested and return the requested 3D model data to resource manager 104 of local computing device 102. Resource manager 104 may store the 3D model data received from remote computing device 118 to local resource database 106. Resource manager 104 may transmit the 3D model data to rendering platform 108 such that rendering engine 112 of rendering platform 108 can render the 3D model object as a function of the 3D model data received from resource manager 104. Accordingly, resource manager 120 can retrieve the requested 3D model data from the master resource database 122 of the remote computing device and return them to resource manager 104 via network 116.

Rendering platform 108 may be embodied as any combination of hardware, firmware, software, or circuitry usable to perform the functions described herein. The illustrative rendering platform 108 includes image analyzer 110 and rendering engine 112, each of which may be embodied as any type of firmware, hardware, software, circuitry, or a combination thereof, that may be configured to perform the functions described herein. In one or more scenarios, the resource manager 104, image analyzer 110, and/or rendering engine 112 may include one or more computer-readable mediums (e.g., memory 204, data storage device 212, and/or any other media storage device) having instructions stored thereon and one or more processors (e.g., the CPU 200) coupled with the one or more computer-readable medium and configured to execute instructions to perform the functions described herein.

Image analyzer 110, which may be embodied as any type of firmware, hardware, software, circuitry, or a combination thereof, may be configured to analyze the captured image to determine one or more features of the images captured by local computing device 102, or more particularly by camera sensor 216 of local computing device 102.

Image analyzer 110 may analyze a 2D image, including the room layout, objects in the room, placement of those objects, and other information. 3D model data and/or metadata may correspond with each of the features in the 2D image. Image analyzer 110 may add or tag metadata in the photograph by comparing objects in the 2D image with stored data in local resource database 106 for corresponding shapes, colors, textures, patterns, labels, or other object details discussed herein. Any correlations between objects in the 2D image and stored 3D model data may help identify actual products (e.g., SKU, etc.) of the objects in the 2D image.

In some examples, the data store of 2D images may include high-resolution photographs. This may help with determining 3D model data, including the make and model of the object that may be printed on the object, a tag attached to the object or other object identifiers. Image analysis for object recognition or other known technologies may also be used to identify the objects.

In some examples, the 3D model data and/or metadata may be provided by an administrative user and/or may be imported from an entity's product catalog database. The metadata may identify the SKU, dimensions, preferred placement (e.g., floor, wall, on top of another 3D model like a table, etc.), or other information of the object. In some examples, the metadata may correspond with product descriptions in an entity's product catalog. The metadata may be used to generate or implement one or more rules associated with the object.

Rendering engine 112, which may be embodied as any type of firmware, hardware, software, circuitry, or a combination thereof, may be configured to generate a 3D model from 3D model data, such as may be received from the master resource database 122 of remote computing device 118 and stored in local resource database 106 of local computing device 102. The 3D model may be rendered using 3D model data, and placed as a 3D model in the virtual environment pursuant to placement and rendering rules defined by the system. It should be appreciated that rendering engine 112 may be configured to render the objects. Such rendering can be performed in real-time (e.g., real-time rendering) or ahead of time (e.g., pre-rendering). When the rendering is performed in real-time (e.g., real-time rendering), for example, a wireframe object stored as 3D model data of the object may be determined and a skin/pattern may be added as an overlay of the wireframe object at run-time. The rendered object (e.g., the 3D model) can appear to be unique at the display of local computing device 102, whereas the dimensions, skin/pattern, and other features of the object are stored and provided to the display in real-time.

Rendering images refers to a series of calculations that are performed to generate a 3D model using rendering engine 112. In other words, each of the 3D models represent a mathematical representation of points and surfaces (e.g., vertices and polygons), generated from 3D model data, in the respective virtual environment by the rendering engine. Such rendering can be performed in real-time (e.g., real-time rendering) or ahead of time (e.g., pre-rendering). While pre-rendering is typically used for creating movies, real-time rendering is often used for rendering scenes in video games or augmented reality or virtual reality settings.

In one or more techniques, the virtual environment may correspond with a virtual reality environment configured on a local computing device 102. At least one object corresponding with a 3D model that is rendered in the virtual reality environment using 3D model data may be selected for placement in the virtual reality environment. Information may be determined regarding a fit, a location, and/or compatibility of at least one 3D model relative to the virtual reality environment. The 3D model may be added to the virtual reality environment based, at least in part, on 3D model data. The virtual reality environment may be rendered on a display of local computing device 102.

Application 114 may be embodied as any type of network-based software application (e.g., cloud application, network application, software-as-a-service (SaaS) application, etc.) configured to communicate with the remote computing device 118 (e.g., in a client-server architecture) over network 116. As described previously, application 114 may be configured to serve as a software-based interface between the user (e.g., via a graphical user interface (GUI) of the application) and resource manager 104.

Application 114 may be configured to interface with image analyzer 110 to retrieve the identified 3D model data of objects in a 2D image and rendering engine 112 to provide the 3D model data to be rendered in the virtual environment. In one or more scenarios, resource manager 104 may be a portion of application 114. In other words, resource manager 104 may be installed with the application, such that the initialization and/or the population of the 3D model data of local resource database 106 is relative to the installation of application 114 and/or the execution of application 114. One or more settings of resource manager 104 may be controlled by the user via the user interface of application 114.

In some examples, resource manager 104, rendering platform 108, image analyzer 110, rendering engine 112, and/or application 114 may be implemented in a cloud-based platform. The computational features of each engine may be performed as a service or function remotely from local computing device 102 and provided via network 116 to local computing device 102.

Remote computing device 118 may be embodied as any type of computing and/or storage device capable of performing the functions described herein. For example, remote computing device 118 may be embodied as, but is not limited to, one or more servers (e.g., stand-alone, rack-mounted, etc.), compute devices, storage devices, routers, switches, and/or combination of compute blades and data storage devices (e.g., of a storage area network (SAN)) in a cloud architected network or data center. As such, while remote computing device 118 is illustrated as a single computing device, in one or more scenarios, remote computing device 118 may include more than one computing device (e.g., in a distributed computing architecture), one or more, or each, of which may be usable to perform at least a portion of the functions described herein.

Remote computing device 118 may contain like components to that of local computing device 102 of FIG. 2. Accordingly, such like components are not described herein to preserve the clarity of the description. In one or more scenarios in which remote computing device 118 may include more than one computing device, one or more, or each, computing device of remote computing device 118 may include different components (i.e., hardware/software resources), the types of which may be predicated upon the type and intended use of each computing device. For example, one or more computing devices of remote computing device 118 may be configured as a database server with less compute capacity relative to the compute capacity of another of the computing devices of remote computing device 118. Similarly, one or more other computing devices of remote computing device 118 may be configured as an application server with more compute capacity relative to the compute capacity of another computing device of remote computing device 118.

Resource manager 120 can retrieve requested 3D model data from the master resource database 122 of remote computing device 118 and return them to resource manager 104 of local computing device 102 via network 116.

Network 116 may be implemented as any type of wired and/or wireless network, including a local area network (LAN), a wide area network (WAN), a global network (the Internet), etc. Accordingly, network 116 may include one or more communicatively coupled network computing devices (not shown) for facilitating the flow and/or processing of network communication traffic via a series of wired and/or wireless interconnects. Such network computing devices may include but are not limited, to one or more access points, routers, switches, servers, computing devices, storage devices, etc.

In some examples, product data may be part of 3D model data and may be stored in master resource database 122, which may comprise a content management system ("CMS"). Product data may refer to a subset of 3D model data that may be mapped to a unique product identifier. The product corresponding to the 3D model data may have physical attributes in a real world environment and the attributes may be stored as 3D model data, such as, for example, dimensions and/or type of surface on which the 3D model of such a product may (e.g., must) be placed in a virtual environment (e.g., wall, floor, and/or ceiling). Master resource database 122 may comprise metadata to identify limitations associated with the placement of 3D models in the virtual environment. Products in this context may represent distinct 3D models that can be rendered and placed in a virtual environment, based on the attributes for the object stored as 3D model data. Products may represent a retail product that can be purchased by a user of a local computing device 102.

In one or more scenarios, master resource database 122 further comprises 3D model data, as discussed herein. For example, 3D model data may include a wire frame for an object and skin or physical attributes for the object, including for example color, texture, material, default dimensions of the object, lighting, depth, and/or other physical attributes. 3D model data may also include information relating to the 3D model's relationships to other 3D models including depth layer, horizontal order, vertical order, rotation offset, height offset, focal group, facing direction, and/or other model information. In some examples, the 3D model data may store relative position information regarding the placement of the 3D model in relation to other 3D models, as the set of 3D models are rendered and placed in the virtual environment.

Master resource database 122 may comprise one or more objects that correspond with "models" and/or "options." For instance, a rug might come in three sizes and three colors. In commerce systems and/or inventory management systems, there may be a model ID and/or object ID for the rug itself, and/or a SKU for one or more, or each, variation of size and/or color. In one or more scenarios, the model ID and/or object ID alone might be insufficient to provide the user with a rendering of one or more, or all, options of the object. In one or more scenarios, the system may be configured to resolve one or more, or all, possible SKU options, and/or to render 3D models of one or more, or each, object, for example, using one or more, or each, possible variation. In one or more scenarios, the system may process one or more 3D models in relation to one or more 3D model data, including for example, SKU option, and/or may understand the relationship of the model ID and/or object ID to the SKU.

Master resource database 122 may include 2D images that can be stored in any format, including high-resolution photographs. This may help with determining 3D model data, including the make and model of an object depicted in the 2D image.

Other data may be stored in the master resource database 122, or a separate database, including master layout database 124. Master layout database 124 may comprise layout data. The layout may correspond with one or more design elements with specific relative positions and orientations to each other and to surfaces. 2D images may be provided as layouts for placement in a virtual environment. Each layout may correspond with data in a content management system (CMS) database. Each design element in the layout may correspond with a database row in master layout database 124. A layout can have many entries for design elements in the database.

Master layout database 124 may comprise 3D model data corresponding with a virtual environment. The virtual environment may include placement limitations in which 3D models have relative direction and position represented by three linear dimensions. Some examples of a virtual environment include a computer rendering or a virtual environment in 3D perspective, a 3D virtual reality simulation, or an actual space viewed through a computer display system with augmented reality overlays of virtual elements in 3D.

Master layout database 124 may comprise layout data and similar objects that may be determined from the 2D image. For example, the system and method may determine objects, room limitations, and/or possible configurations from the photograph and store the data for future use. In some examples, the photograph may help determine additional object placement rules based on an original design intent of the room, but adjust the layout for different size and shape rooms. The room layout and objects in the photograph may be programmatically grouped in master layout database 124 (e.g., corresponding with a shared parameter or tag, classified as related, etc.).

Master layout database 124 may comprise floorplans and/or building templates. The data may include information to populate the virtual environment, including a room shape (e.g. G shaped, L shaped, and/or T shaped), distance clearance for safety criteria (e.g., accessibility, maneuverability, spacing between walls for accessibility to utility outlets, etc.), workable triangle (e.g., placing a stove, a sink, and a refrigerator in a triangle layout representing traffic flow within a kitchen), or other virtual environment objects (e.g., walkways, ventilation, stairs, windows, doorways, etc.).

Master layout database 124 may comprise objects depicted in the 2D image, referred to interchangeably as inspirational design elements. These objects in the 2D image may be grouped in the master layout database 124. In some examples, the objects in the 2D image may be analyzed and tagged with metadata and the metadata may be matched to stored metadata in master layout database 124. A user may select the 2D image at application 114 and rendering engine 112 may select these objects from master layout database 124 and add them to the virtual environment in the same grouping as the 2D image.

Improvements may be useful to provide technologies that may efficiently render objects (e.g., consumer products) that appear in 2D images (e.g., photographs) in the virtual environment(s).

The systems and methods described in the present disclosure are designed to facilitate the easy placement of complex arrangements of objects in a virtual environment by simply selecting 3D models in a layout or series of layouts and then selecting where in the virtual environment the 3D models should be placed starting with a mounting point. In a kitchen application, a mounting could be a sink, oven, hood, or a refrigerator. A coffee table or large couch might also be mounting points for a layout of furniture. This solution allows for many 3D models from a single layout to be placed into a complex 3D arrangement with minimal outside input once 3D models are selected from the layout. Using this approach, 3D models can be chosen out of one or more, or multiple, layouts and combined to create a unique 3D arrangement, merging favorite 3D models of each layout.

In some examples, system 100 may be configured to determine the resolution, and/or the file size, of 3D models on an object-specific and/or platform-specific basis. For instance, system 100 may be configured to asynchronously and/or automatically generate different resolutions and/or compression formats for one or more, or all, supported operating systems and/or hardware devices. Object and platform combinations with a specific resolution of a 3D model that may be used are identified by system 100. System 100 also can identify which objects in a room type or application should be featured and therefore have higher resolution.

In some examples, system 100 may be configured to recognize device capacity (for example, local computing device 102) and may adapt accordingly. For example, for a device and/or a virtual reality setting, system 100 may have a certain maximum capacity value for 3D model data memory, for example, because of how many 3D models may be placed in the virtual reality setting and/or rendering capacity of the device. Remote computing device 118 can access the mobile device's capacity. Remote computing device 118 may adjust the texture resolution, for example, based upon the capability of the mobile device and transmit the 3D model data to the mobile device that includes the adjusted texture resolution or other values. System 100 can be configured to allocate more memory for (e.g., important) objects. The memory and/or the resolution may vary, for example, depending on the distance of the user's perspective from the objects in view.

In some examples, system 100 may be configured to interface with commerce systems and/or inventory management systems. Commerce systems and/or inventory management systems may define objects as "models" with "options. "For instance, a rug might come in three sizes and three colors. In commerce systems and/or inventory management systems, there may be a model ID and/or object ID for the rug itself and/or a SKU for one or more, or each, variation of size and/or color. In one or more scenarios, the model ID and/or object ID alone might be insufficient to provide the user with a rendering of one or more, or all, options of the object. In one or more scenarios, system 100 may configured to resolve one or more, or all, possible SKU options, and/or to render 3D models of one or more, or each, object, for example, using one or more, or each, possible variation. In one or more scenarios, system 100 may generate one or more 3D models using 3D model data in relation to one or more, or each, SKU option, and/or may understand the relationship of the model ID and/or object ID to the SKU.

In some examples, system 100 may be configured to use procedural modeling. For example, system 100 may be configured for cabinet doors by defining a 2D profile of the door and the rules for how to offset door and drawer style profiles from the face of a cabinet. System 100 may be configured to dynamically "stretch" the door parameters to fit one door to any cabinet size, instead of modeling every door shape and size. For example, system 100 can be configured to do this for crown molding, shoe molding, countertops, counter-top edge profiles, baseboards, ceiling structures, showers, and/or ceiling lights, etc.

In some examples, system 100 may be configured to render "assemblies," which may correspond with objects mounted on other objects and/or arranged into some kind of layout. For example, cabinets in a kitchen, a faucet on a vanity, and/or a lamp on a table are examples of assemblies. System 100 can be configured with the ability to pre-assemble objects into compound objects and/or assemblies, and/or apply a specific price to the compound object and/or assembly. System 100 can be configured with the ability to mount an object on another object using one or more rules and/or metadata that may define fit, location, and/or compatibility. System 100 can be configured such that assemblies can also be editable or not editable.

In some examples, system 100 may be configured with one or more business rules for objects and/or assemblies that may define what object and/or assembly can physically fit, where the object and/or assembly may fit, how the object and/or assembly may be oriented, and/or whether the object and/or assembly can be changed. For example, system 100 may be configured with an "object class" concept to define compatibility/fit between objects. For example, a 3-hole faucet fits only on a 3-hole vanity, or a sofa must rest on a floor, or a dishwasher must be against a wall and under a countertop.

In another example, if a user attempts to place two 3D models in the same virtual environment, system 100 may be configured to determine the compatibility/fit between such objects and arrange them accordingly. For example, if a user attempts to place a virtual end table and a virtual lamp in the same virtual location, system 100 may be configured to arrange the virtual end table on the floor of the virtual environment, and the virtual lamp on top of the virtual end table. For example, system 100 may be configured to allow for various levels of specificity to determine fit. Sometimes there may be (e.g., may only be) one specific object that can fit on another specific object. Other times there may be a larger set of objects that can fit together.

In addition to physical compatibility, for example, system 100 may be configured to allow for merchandising rules that allow the content managers to say which categories or other object attributes are allowed to fit in a location. For example, system 100 may be configured to such that the user can put any 3-hole faucet on this 3-hole vanity (using object class), but only Kohler® faucets are allowed if the users want a specific price over a Labor Day Sale (using object manufacturer).

In some examples, system 100 may be configured with one or more composition properties that may define how an object can be composed in a scene. For example, regarding refrigerators, system 100 may be configured to require that refrigerators have to be mounted on a floor and against a wall, that the refrigerators cannot be rotated, and/or that refrigerator doors can be rotated, but perhaps only about a specific mounting point and/or within a specific arc.

In some examples, system 100 may be configured with one or more composition properties that may allow animations of objects for manipulating one or more object parts, for example, to show the object inside and/or some range of motion. For example, regarding refrigerators, system 100 may be configured to allow animation to be data-driven and/or assigned for class(es) and/or objects, for example, assigned to one or more, or each, (e.g., specific) 3D model. System 100 can be configured to allow objects to make sounds, and/or for lighting (e.g., lights, lamps, and/or ceiling fans) to have properties that may allow control of angle, spread, and/or intensity.

Augmented reality may be incorporated to blend a user's environment with digital information (e.g., the 3D model data), generally in real time. In other words, the digital information may be embedded, or overlay to, the actual environment. Typically, image recognition software analyzes environment information as detected from one or more images of the environment, as well as a location of the computing device that captured the image relative to the environment at the time at which the respective images were taken and renders realistic 3D models in the environment. Because it can be difficult to anticipate the movement of the computing device relative to the environment in advance, among other reasons, the 3D models may be rendered in real-time.

Elements/components of system 100 disclosed herein may be adapted for augmented reality.

Additional details of creating a floorplan and/or layout of objects from images, generating a virtual space corresponding thereto, displaying and locating digital models of objects in the virtual space and facilitating purchase of corresponding objects are disclosed and depicted in the following patents, each of which is incorporated in its entirety herein by reference: U.S. Pat. Nos. 10,600,255, 10,672,191, 11,049,317, 11,544,901, 11,734,929, 11,875,280, 11,935, 192, and 12,073,618. The various features, functions, processes and other elements disclosed and depicted therein may be used in combination with the features described herein.

FIG. 3 is an example flow diagram for generating a 3D virtual space based on an image of a physical space in a mobile computing environment that may be executed by a mobile computing device (e.g., mobile computing device 102 of FIG. 1), and/or more particularly by resource manager 104 and/or application 114 of mobile computing device 102, in accordance with an embodiment of the present invention. In an illustrative example, application 114 is used to generate a 3D virtual space from a 2D image of a physical space.

Method 300 begins at block 302, in which application 114 receives an image of a physical space on mobile computing device 102. In some scenarios, display 210 of mobile computing device 102 may be a touchscreen display responsive to contact from a human digit, stylus, and/or other input devices. Through interaction with display 210 of mobile computing device 102 and application 114, a user may upload or access an image of a physical space.

In block 304, image analyzer 110 utilizing one or more machine learning techniques, identifies planes of the physical space. In this embodiment, the machine learning model can identify the plans by locating corners in the physical space and extending planes for the walls, the floor, and the ceiling of the physical space from the corners. In some embodiments the machine learning model can be trained to identify planes of a physical space depicted in a 2D image based on training data that includes instances of labeled images as discussed above. In instances where appropriate, planes identified by the machine learning model can be extended as appropriate. For example, a plane corresponding with a wall occluded by objects can be extended to fill the spaces occluded by the objects.

In block 306, image analyzer 110 can utilize the machine learning model to identify objects (e.g., furniture) of the physical space depicted in the 2D image (e.g., an object in a 2D image can be identified by matching the object with an image of the object in the object database). Processing then proceeds to block 308, where the machine learning model determines dimensions of the objects based on objects stored in an object database (e.g., local resource database 106 and/or master resource database 122) which include dimensions (e.g., width, length, height) of objects and identification information (e.g., object images, product numbers, model numbers, identifying marks) of the objects as discussed above. In other embodiments, dimensions of objects can be determined based on machine learning techniques that identify objects with a known or standard sizes depicted in the 2D image. In some instances, application 114 can provide an interface through which a user can provide confirmation of an identification and a size of the object as well as make corrections to the identification and the size of the object.

In block 310 image analyzer 110, using visual analysis of the 2D image, determines the dimensions of the physical space based on the dimensions of the objects. As disclosed above, the dimension of the object can be determined based on an object database or a machine learning technique. Based on relative dimensions of the physical space with respect to the object, application 114 can determine the dimensions of the physical space from the dimensions of the object. For example, a 2D image can depict an object adjacent to a wall in a physical space. In this example, the height of the wall can be three times as tall as the height of the object. Therefore, based on the height of the object, which can be determined based on an object database or based on a machine learning technique, the height of the wall can be determined by multiplying the height of the object by three.

In block 312, rendering platform 108 generates a 3D virtual space corresponding to the physical space based on the dimensions of the physical space and subsequently populate the 3D virtual space with virtual objects in block 314. In some instances, application 114 can be utilized to customize the virtual objects in the 3D space (e.g., block 316).

Figure 4:
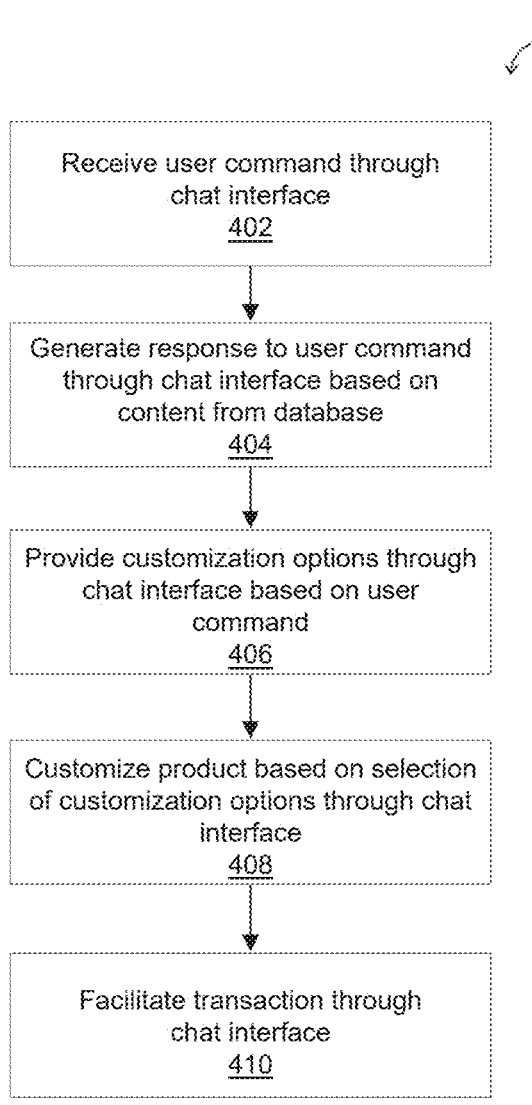
FIG. 4 is an example flow diagram of example methods supported by the disclosed technology, in accordance with the embodiments disclosed herein.

FIG. 4 is an example flow diagram for a chat interface through which various user commands, including requests for information, requests for customization, and transaction requests can be entered in a mobile computing environment that may be executed by a mobile computing device (e.g., mobile computing device 102 of FIG. 1), in accordance with an embodiment of the present invention. In an illustrative example, application 114 is used to provide a chat interface through which a user can issue user commands in natural language text.

Method 400 begins at block 402, in which rendering platform 108 receives a user command through a chat interface on mobile computing device 102. In some scenarios, display 210 of mobile computing device 102 may be a touchscreen display responsive to contact from a human digit, stylus, and/or other input devices. Through interaction with display 210 of mobile computing device 102 and application 114, a user may input natural language text that include user commands, requests for information, requests for customization, and transaction requests.

In block 404, rendering platform 108, using a machine learning model generates a response to user command through chat interface based on content from database. In this embodiment, the machine learning model parses the received user command to determine query terms, searches for information that satisfy the query terms, and generates a response based on the search of the database, derived from factual information.

In block 406, rendering platform 108 provides customization options through chat interface based on user commands. Options for customizing a product can be associated with certain keywords that may be entered through the chat interface as user commands or provided through the chat interface as responses. For example, a user can provide a user command to request recommendations for customizing a product, such as by customizing a color. The user command can include keywords, such as "color", that prompt options for customizing the product. In this example, the options for customizing the product can include options for changing the color of the product. In some instances, options for customizing a product can be provided based on intent of a user demand.

In block 408, rendering platform 108 customizes product based on selection of customization options through chat interface and can facilitate transactions through the chat interface (block 410).

Figure 5:
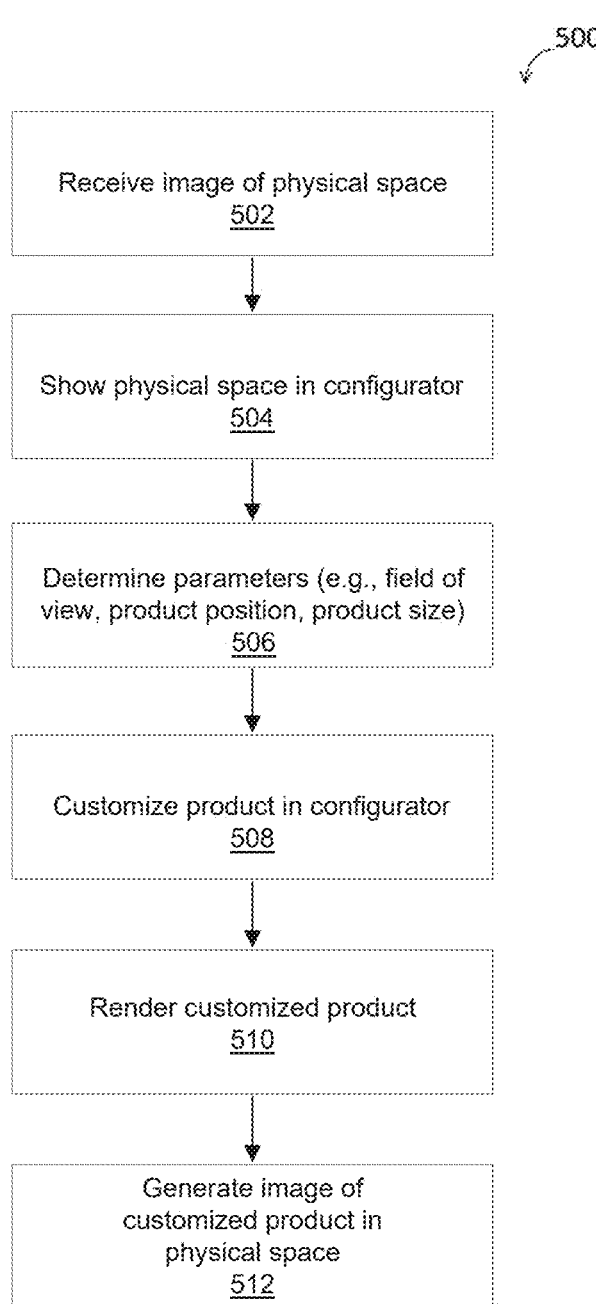
FIG. 5 is an example flow diagram of example methods supported by the disclosed technology, in accordance with the embodiments disclosed herein.

FIG. 5 is an example flow diagram for generating an on-demand render of a customized product in a mobile computing environment that may be executed by a mobile computing device (e.g., mobile computing device 102 of FIG. 1), and/or more particularly by resource manager 104 and/or application 114 of mobile computing device 102, in accordance with an embodiment of the present invention. In an illustrative example, rendering platform 108 is used to generate an on demand render chat interface through which various user commands, including requests for information, requests for customization, and transaction requests can be entered.

Method 500 begins at block 502, in which rendering platform 108 receives a user an image of a physical space on mobile computing device 102 via application 114. Rendering platform 108 can then show the physical space in the configurator (block 504) and determine parameters (block 506) for rendering a product in a 3D virtual space as described above. Rendering platform 108 can then customize the product in the configurator (block 508) by selecting one or more options for customizing the product in the user interface. Rendering platform 108 can then render the customized product (block 510) based on the selected customization options. As discussed above, the selected customization options for the customized product can be stored in a structured data object (e.g., JSON file). The structured data object can describe the product in terms of a structure of 3D model pieces that can be joined together to create a 3D model of the product. For each customization option selected for the customized product, a 3D model piece can be identified based on the structured data object. A custom 3D model can be generated based on the structure described in the structured data object and the 3D model pieces identified based on the structured data object.

Figure 6:
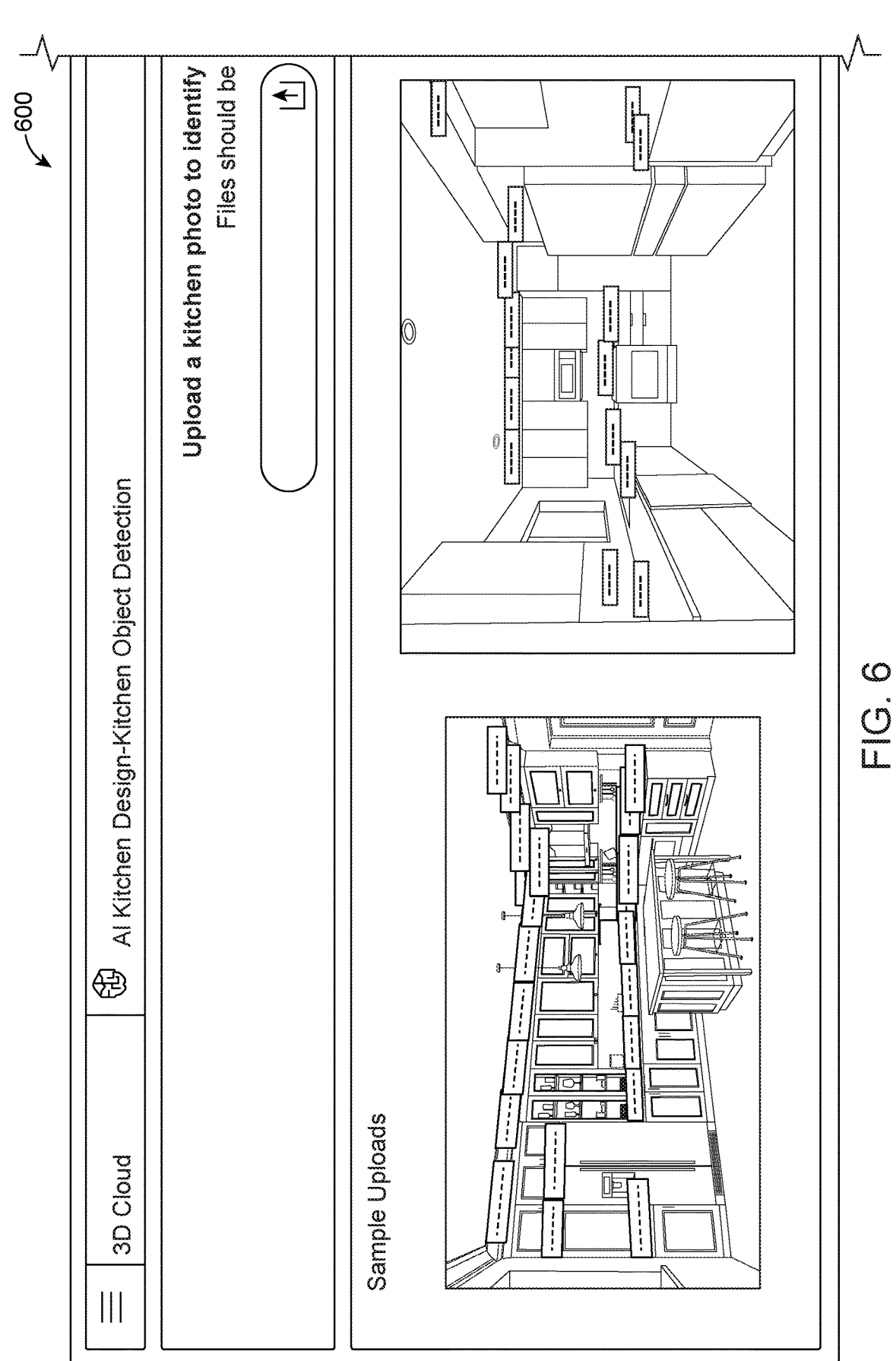
FIG. 6 is an example screenshot supported by the disclosed technology, in accordance with the embodiments disclosed herein.
Figure 6:
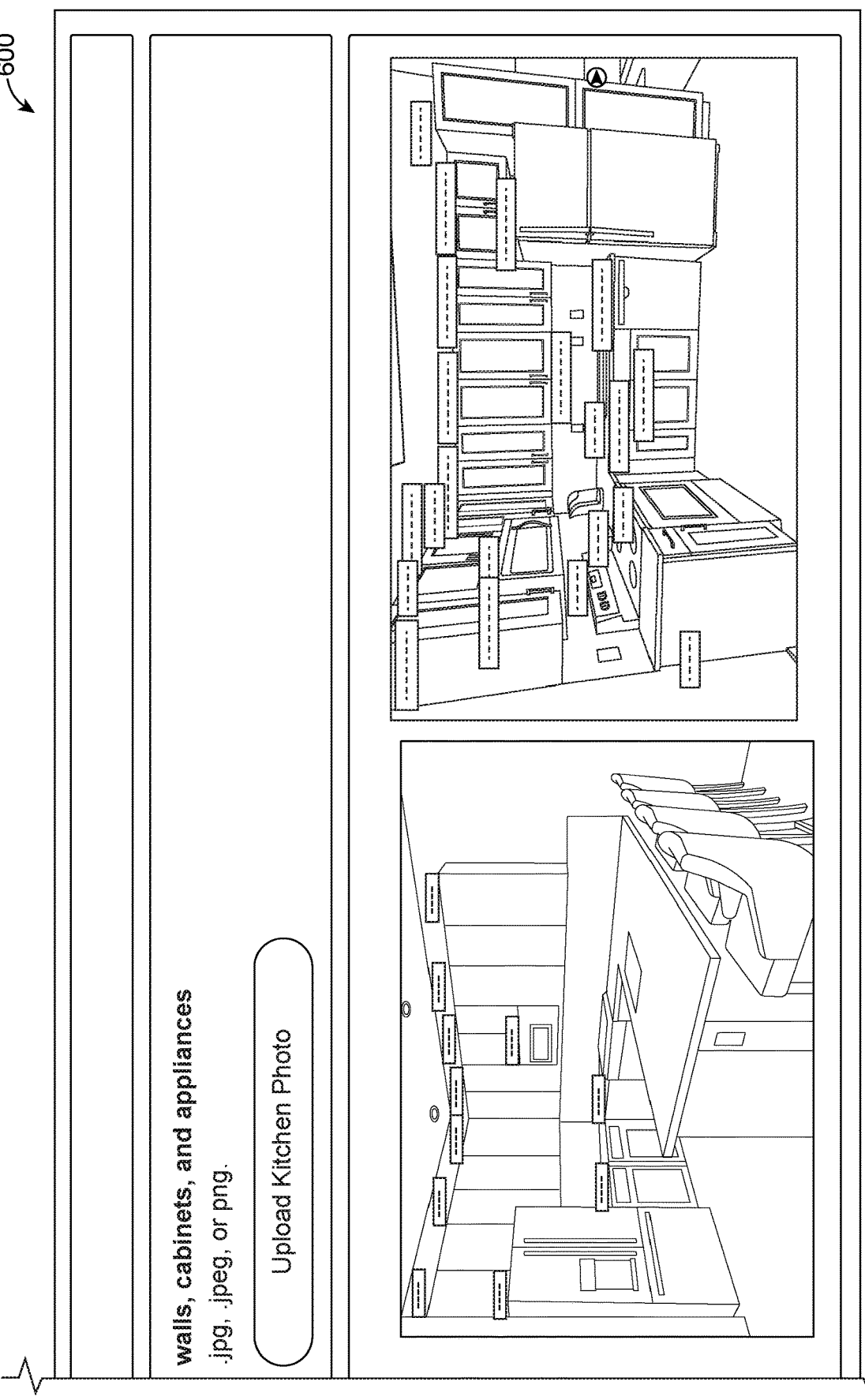

FIG. 6 is an example screenshot of user interface 600 which allows for a user to upload a two dimensional image. User interface 600 can also display one or more sample uploads that were previously uploaded and stored on an object database (e.g., local resource database 106 and/or master resource database 122), in accordance with an embodiment of the present invention.

Figure 7:
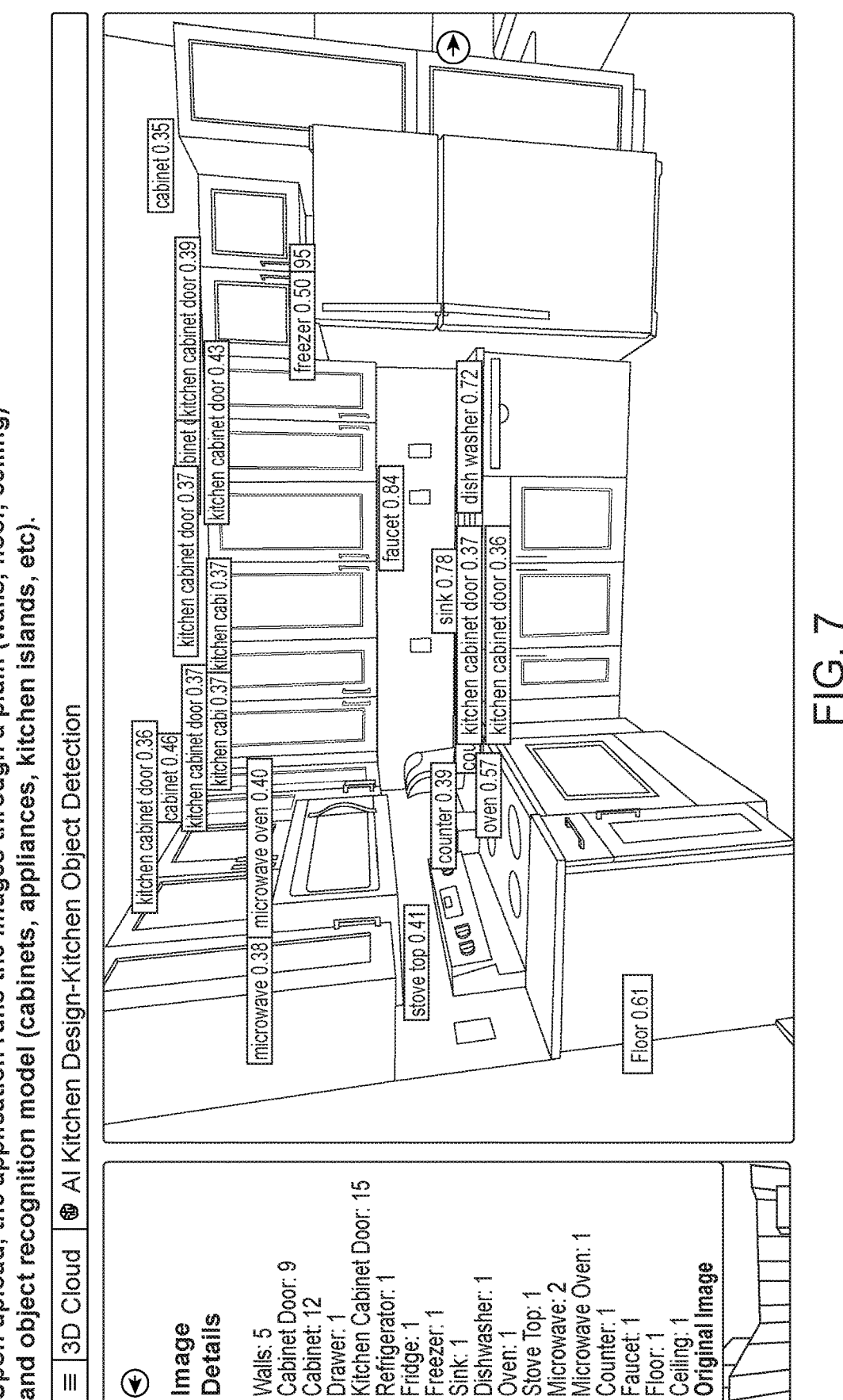
FIG. 7 is an example screenshot supported by the disclosed technology, in accordance with the embodiments disclosed herein.

FIG. 7 is an example screenshot of a user interface 700 which depicts results of an image analysis performed on a two dimensional image which depict one or more relative measurements of objects detected within the two dimensional image, in accordance with an embodiment of the present invention.

Figure 8:
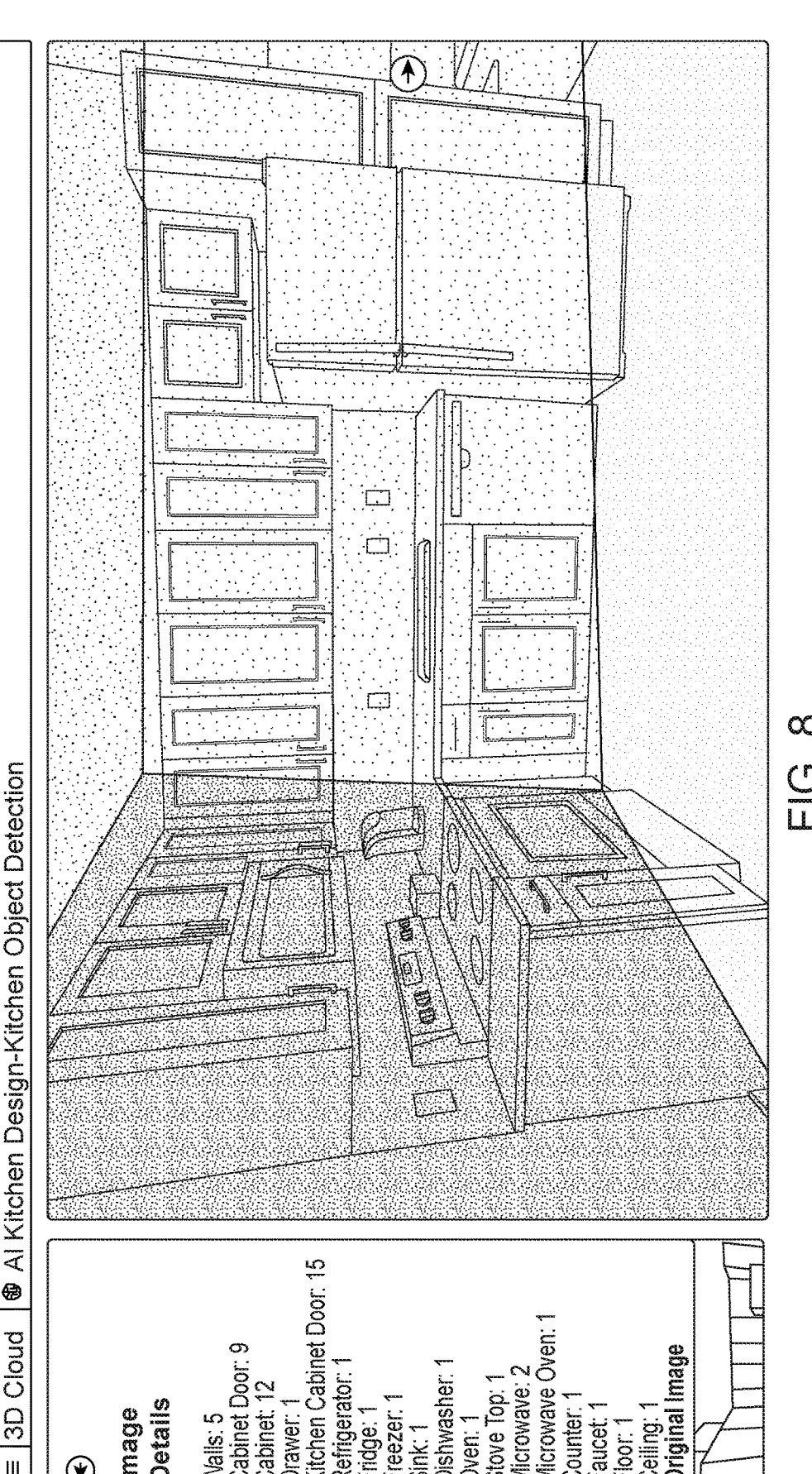
FIG. 8 is an example screenshot supported by the disclosed technology, in accordance with the embodiments disclosed herein.

FIG. 8 is an example screenshot of user interface 800 which depicts results of an image analysis performed on a two dimensional image which depict one or more identified planes.

Figure 9:
FIG. 9 is an example illustration supported by the disclosed technology, in accordance with the embodiments disclosed herein.

FIG. 9 is an example illustration two dimensional image 900 which depicts results of an image analysis that identifies object dimensions, in accordance with an embodiment of the present invention.

Figure 10:
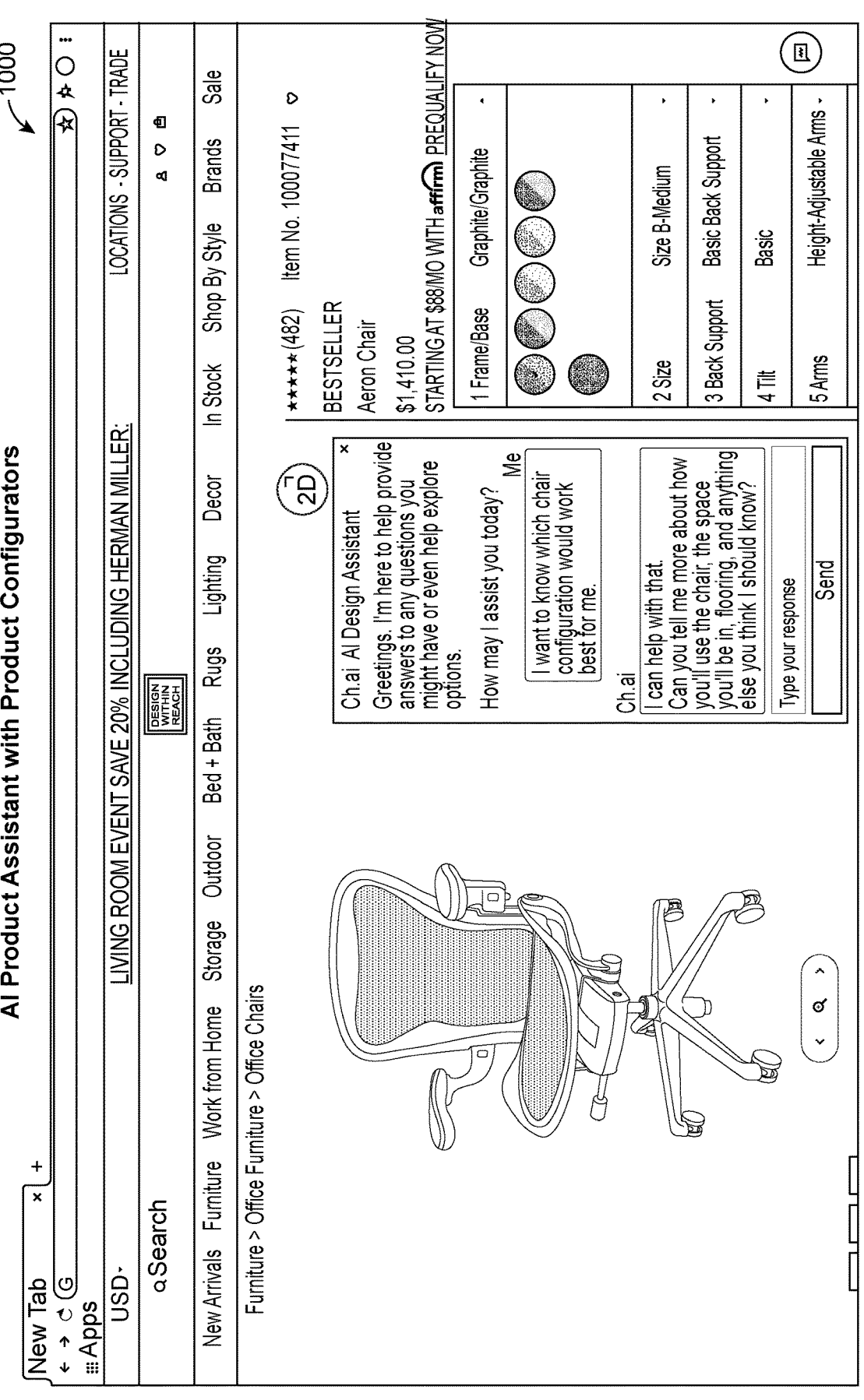
FIG. 10 is an example illustration supported by the disclosed technology, in accordance with the embodiments disclosed herein.

FIG. 10 is an example illustration of user interface 1000 of a product configurator, in accordance with an embodiment of the present invention. In this illustration, a chat interface overlay is displayed and configured to interface with commerce systems that may define objects as "models" with "options".

Figure 11:
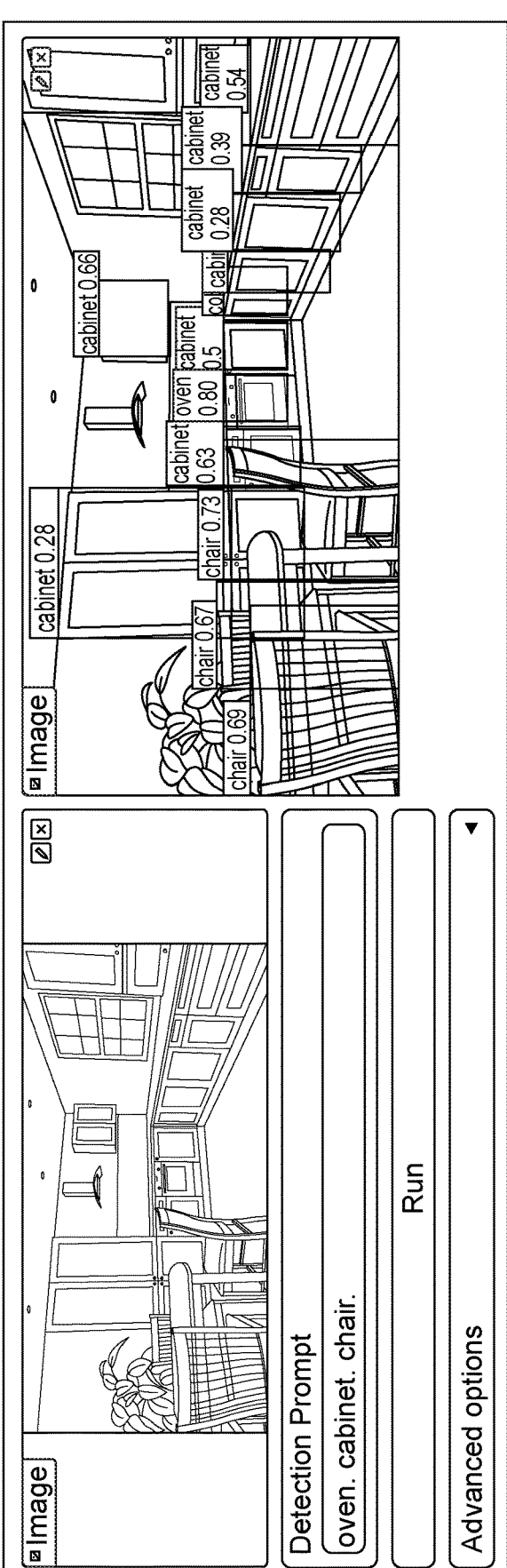
FIG. 11 is an example screenshot supported by the disclosed technology, in accordance with the embodiments disclosed herein.

FIG. 11 is an example screenshot of user interface 1100 which depicts a generated 3D virtual space and graphics overlay which show relative object dimensions for the detected objects, in accordance with an embodiment of the present invention.

Figure 12:
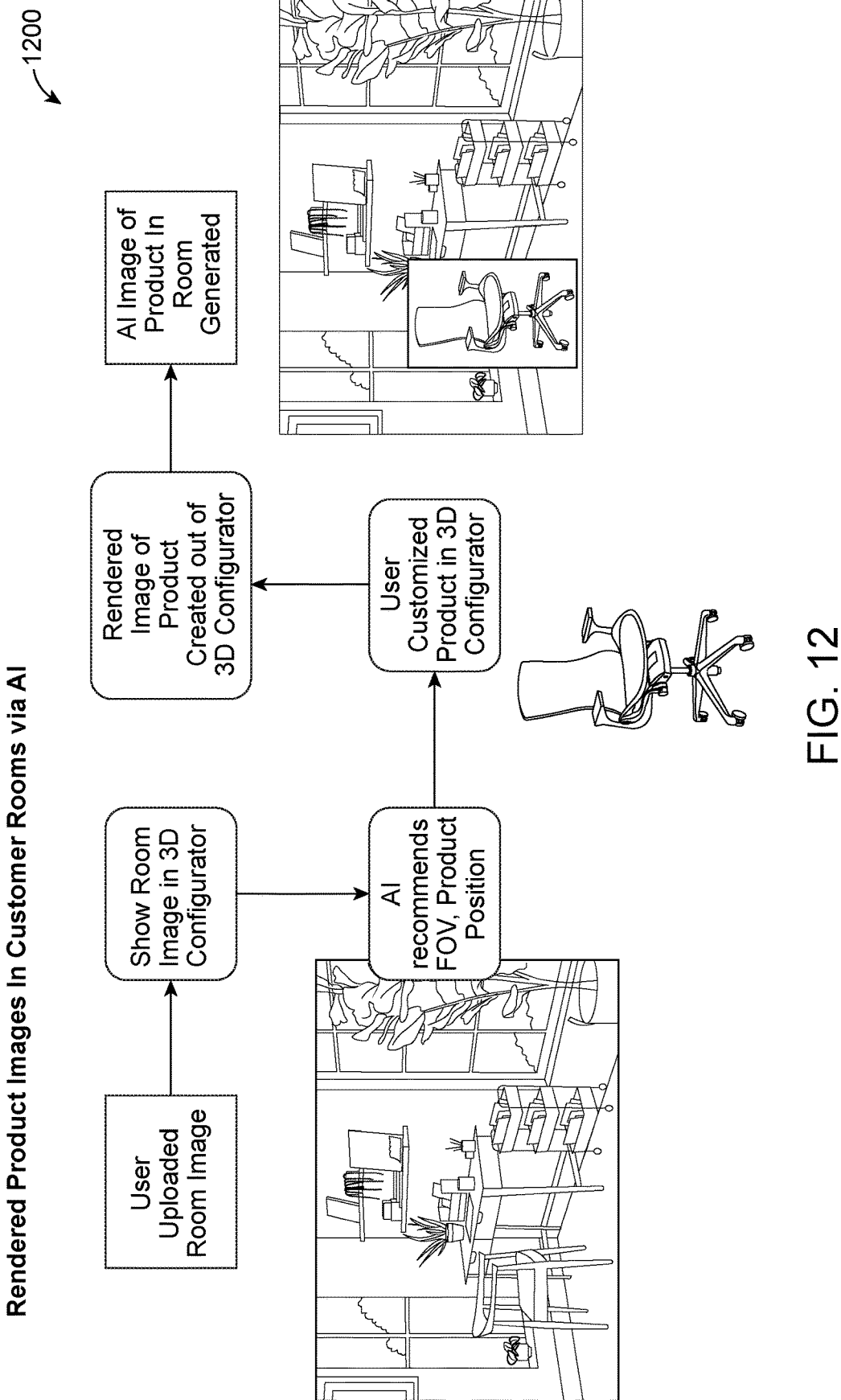
FIG. 12 is an example flow diagram supported by the disclosed technology, in accordance with the embodiments disclosed herein.

FIG. 12 is an example flow diagram 1200 which depicts a process to generate a rendered product image in a physical space. In this example flow diagram, a user has provided a 2D image of a room with various furniture. In this example, embodiments of the present invention generates a 3D virtual space representing the room is generated and showing the 3D configurator. In this example, embodiments of the present invention recommend a field of view, product, and position information for a selected product. The user can select a new piece of furniture, modify it according to user selections, and embodiments of the present invention can render the image of the customized product created using the 3D configurator and subsequently display the new piece of furniture (i.e., the customized product) in the 3D virtual space. It should be noted that since dimensions of the piece of furniture and the dimensions of the 3D virtual space have been determined in a manner described by the methods above, the dimensions of the new piece of furniture is sized appropriate for the 3D virtual space. In this manner, embodiments of the present invention provide the user with an accurate preview of how the new piece of furniture would look in the room.

While the present disclosure has been illustrated and described in detail in the drawings and foregoing description, the same is to be considered as illustrative and not restrictive in character, it being understood that only certain examples have been shown and described, and that all changes and modifications that come within the spirit of the present disclosure are desired to be protected.

Where components, logical circuits, or engines of the technology are implemented in whole or in part using software, in one embodiment, these software elements can be implemented to operate with a computing or logical circuit capable of carrying out the functionality described with respect thereto, such as those illustrated in FIG. 1 and FIG. 2. After reading this description, it will become apparent to a person skilled in the relevant art how to implement the technology using other logical circuits or architectures.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for generating a customized product using a chat based product configurator comprising:

providing, by one or more processors, a chat interface for a rendering platform configured to customize a plurality of products for display within a chat window of the chat interface based on one or more user commands and to display, within a chat window of the chat interface, a three-dimensional visualization of a customized product;

responsive to receiving a user command requesting customization of a product, by the one or more processors, generating a customized three-dimensional product using a rendering engine of the rendering platform, based on selections included in the one or more user commands, wherein the selections correspond to structured data objects that encode corresponding three dimensional model pieces associated with respective customization options, wherein the rendering engine at run-time assembles the encoded components to compose the customized three-dimensional product; and displaying, by the one or more processors, the customized product within the chat window of the chat interface of the rendering platform.

2. The computer-implemented method of claim 1, wherein generating a customized product using a rendering engine of the rendering platform, based on selections included in the one or more user commands comprises:

searching, by one or more processors, a database for product documentation associated with the product;

determining, by one or more processors, compatibility of selected customization options; and responsive to determining compatibility of the selected customization options, determining, by one or more processors, a corresponding structured data object that represents a respective customization option to create a three dimensional model of the product.

3. The computer-implemented method of claim 2, wherein product documentation in the database comprises information associated with the plurality of products and customization options for the plurality of products including product sizes, finishes, and optional features associated with respective products of the plurality.

4. The computer-implemented method of claim 3, wherein the customization options are stored as a structured data object that describes a product in terms of a structure of three dimensional model pieces that can be joined together to create a three dimensional model of the product, wherein each customization option selected has a corresponding three dimensional model piece for the customized product.

5. The computer-implemented method of claim 1, wherein the chat interface includes one or more display elements configured to enable user selection of the customized product for purchase within the chat interface.

6. The computer-implemented method of claim 1, further comprising:

responsive to receiving a user command that includes a query for information associated with a product in the plurality of products, searching, by one or more processors, a database for product documentation associated with the product; and providing, by one or more processors, to the user via the chat window of the chat interface, curated answers for the user query based on results of the searched database.

7. The computer-implemented method of claim 1, further comprising:

responsive to receiving a subsequent user command, modifying, by one or more processors, the customized product according to user selections associated with the subsequent user command; and generating, by one or more processors, a preview of the modified product within the chat window.

8. The computer-implemented method of claim 1, further comprising:

rendering, by one or more processors, the customized product as a virtual object for display in a generated three dimensional virtual space;

generating, by one or more processors, a preview of the virtual object based on the rendering of the customized product within the chat window;

responsive to receiving a user command to display the virtual object in the generated three dimensional virtual space, placing, by one or more processors, the virtual object representing the customized product in the generated three dimensional virtual space according to selections made by the user, wherein the virtual object has dimensions sized to fit within corresponding dimensions of the three dimensional virtual space and is adjusted to relative dimensions of other virtual objects depicted in the three dimensional virtual space; and displaying, by one or more processors, the virtual object placed within the generated three dimensional virtual space within the chat window of the chat interface.

9. A computer system for generating a customized product using a chat based product configurator, the computer system comprising:

a chat interface for a rendering platform having one or more computer processors configured to customize a plurality of products for display within a chat window of the chat interface based on one or more user commands and to display, within a chat window of the chat interface, a three-dimensional visualization of a customized product;

a rendering engine of the rendering platform configured to generate a customized three-dimensional product based on selections included in the one or more user commands, wherein the selections correspond to structured data objects that encode corresponding three dimensional model pieces associated with respective customization options, wherein the rendering engine at run-time assembles the encoded components to compose the customized three-dimensional product; and one or more computer readable storage media having computer readable program instructions stored on the one or more computer readable storage media for execution by at least one or more processors, wherein the stored program instructions execute a computer-implemented method comprising program instructions to display the customized product within the chat window of the chat interface of the rendering platform.

10. The computer system of claim 9, wherein a rendering engine of the rendering platform configured to generate a customized product based on selections included in the one or more user commands comprises:

one or more processors;

one or more computer readable storage media having computer readable program instructions stored on the one or more computer readable storage media for execution by the one or more processors, wherein the stored program instructions comprise:

program instructions to search a database for product documentation associated with the product;

program instructions to determine compatibility of selected customization options; and program instructions to, responsive to determining compatibility of the selected customization options, determine a corresponding structured data object that represents a respective customization option to create a three dimensional model of the product.

11. The computer system of claim 10, wherein product documentation in the database comprises information associated with the plurality of products and customization options for the plurality of products including product sizes, finishes, and optional features associated with respective products of the plurality.

12. The computer system of claim 11, wherein the customization options are stored as a structured data object that describes a product in terms of a structure of three dimensional model pieces that can be joined together to create a three dimensional model of the product, wherein each customization option selected has a corresponding three dimensional model piece for the customized product.

13. The computer system of claim 9, wherein the chat interface includes one or more display elements configured to enable user selection of the customized product for purchase within the chat interface.

14. The computer system of claim 9, wherein the stored program instructions on the one or more computer readable storage media further comprise:

program instructions to, responsive to receiving a user command that includes a query for information associated with a product in the plurality of products, search a database for product documentation associated with the product; and program instructions to provide to the user via the chat window of the chat interface, curated answers for the user query based on results of the searched database.

15. The computer system of claim 9, wherein the stored program instructions on the one or more computer readable storage media further comprise:

program instructions to, responsive to receiving a subsequent user command, modify the customized product according to user selections associated with the subsequent user command; and program instructions to generate a preview of the modified product within the chat window.

16. The computer system of claim 9, wherein the stored program instructions on the one or more computer readable storage media further comprise:

program instructions to render the customized product as a virtual object for display in a generated three dimensional virtual space;

program instructions to generate a preview of the virtual object based on the rendering of the customized product within the chat window;

program instructions to, responsive to receiving a user command to display the virtual object in the generated three dimensional virtual space, place the virtual object representing the customized product in the generated three dimensional virtual space according to selections made by the user, wherein the virtual object has dimensions sized to fit within corresponding dimensions of the three dimensional space and is adjusted to relative dimensions of other virtual objects depicted in the three dimensional virtual space; and program instructions to display the virtual object placed within the generated three dimensional virtual space within the chat window of the chat interface.

17. A computer program product comprising:

one or more non-transitory computer readable storage media and program instructions stored on the one or more non-transitory computer readable storage media, the program instructions for execution by one or more processors comprising:

program instructions to provide a chat interface for a rendering platform configured to customize a plurality of products for display within a chat window of the chat interface based on one or more user commands and to display, within a chat window of the chat interface, a three-dimensional visualization of a customized product;

program instructions to, responsive to receiving a user command requesting customization of a product, by the one or more processors, generate a customized three-dimensional product using a rendering engine of the rendering platform, based on selections included in the one or more user commands, wherein the selections correspond to structured data objects that encode corresponding three dimensional model pieces associated with respective customization options, wherein the rendering engine at run-time assembles the encoded components to compose the customized three-dimensional product; and program instructions to display the customized product within the chat window of the chat interface of the rendering platform.

18. The computer program product of claim 17, wherein generating a customized product using a rendering engine of the rendering platform, based on selections included in the one or more user commands comprises:

program instructions to search a database for product documentation associated with the product;

program instructions to determine compatibility of selected customization options; and program instructions to, responsive to determining compatibility of the selected customization options, determine a corresponding structured data object that represents respectively selected options to create a three dimensional model of the product.

19. The computer program product of claim 18, wherein product documentation in the database comprises information associated with the plurality of products and customization options for the plurality of products including product sizes, finishes, and optional features associated with respective products of the plurality.

20. The computer program product of claim 19, wherein the customization options are stored as a structured data object that describes a product in terms of a structure of three dimensional model pieces that can be joined together to create a three dimensional model of the product, wherein each customization option selected has a corresponding three dimensional model piece for the customized product.

\* \* \* \* \*